US012639162B2

(12) United States Patent
Wells et al.

(10) Patent No.: US 12,639,162 B2
(45) Date of Patent: May 26, 2026

(54) SSD ARCHITECTURE SUPPORTING LOW LATENCY OPERATION

(71) Applicant: Kioxia Corporation, Tokyo (JP)

(72) Inventors: Steven Wells, Rancho Cordova, CA (US); Mark Carlson, Longmont, CO (US); Amit Jain, Cupertino, CA (US); Narasimhulu Dharani Kotte, Fremont, CA (US); Senthil Thangaraj, Fremont, CA (US); Barada Mishra, Sunnyvale, CA (US); Girish Desai, Cupertino, CA (US)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/765,622

(22) Filed: Jul. 8, 2024

(65) Prior Publication Data

US 2024/0362111 A1      Oct. 31, 2024

Related U.S. Application Data

(60) Continuation of application No. 17/700,321, filed on Mar. 21, 2022, now Pat. No. 12,032,438, which is a
(Continued)

(51) Int. Cl.
  *G06F 11/10*      (2006.01)
  *G06F 3/06*      (2006.01)
(52) U.S. Cl.
  CPC .......... *G06F 11/1008* (2013.01); *G06F 3/061* (2013.01); *G06F 3/0611* (2013.01);
(Continued)
(58) Field of Classification Search
  CPC ........... H03M 13/1108; H03M 13/1111; G06F 11/08–1072; G06F 11/108
  See application file for complete search history.

(56) References Cited

U.S. PATENT DOCUMENTS 8,977,805 B2    3/2015  Maislos et al.
9,760,311 B1 *  9/2017  Amir ..................... G06F 1/3275
(Continued)

FOREIGN PATENT DOCUMENTS

CN      102763090 A      10/2012
CN      103339617 A      10/2013
(Continued)

OTHER PUBLICATIONS

Bill Martin, "I/O Determinism and Its Impact on Data Centers and Hyperscale Applications," Flash Memory Summit, 2017, pp. 1-14.
(Continued)

*Primary Examiner* — Michael Maskulinski
(74) *Attorney, Agent, or Firm* — Foley & Lardner LLP

(57)      ABSTRACT

In one embodiment, a solid state drive (SSD) comprises a plurality of non-volatile memory dies communicatively arranged in one or more communication channels, each of the plurality of non-volatile memory dies comprising a plurality of physical blocks, one or more channel controllers communicatively coupled to the one or more communication channels, respectively, and a memory controller communicatively coupled to the plurality of non-volatile memory dies via the one or more channel controllers, wherein the memory controller is configured to assign (i) the plurality of physical blocks of a first die of the plurality of non-volatile memory dies to only a first region and (ii) the plurality of physical blocks of a second die of the plurality of non-volatile memory dies to only a second region, perform only read operations on the first region in a first operation mode, and perform write operations or maintenance operations on the second region in a second operation mode concurrently with read operations on the first region in the first operation mode.

20 Claims, 15 Drawing Sheets

Related U.S. Application Data division of application No. 15/800,742, filed on Nov. 1, 2017, now Pat. No. 11,294,594.

(60) Provisional application No. 62/542,108, filed on Aug. 7, 2017.

(52) U.S. Cl.
CPC .......... *G06F 3/0644* (2013.01); *G06F 3/0659* (2013.01); *G06F 3/0679* (2013.01); *G06F 11/1048* (2013.01)

(56) References Cited

U.S. PATENT DOCUMENTS

| | | | |
|---|---|---|---|
| 10,289,314 | B2 | 5/2019 | Liu et al. |
| 2010/0250826 | A1 | 9/2010 | Jeddeloh |
| 2011/0069526 | A1 | 3/2011 | Schuette |
| 2011/0185114 | A1 | 7/2011 | Bolanowski |
| 2011/0197045 | A1 | 8/2011 | Okamoto |
| 2013/0121086 | A1 | 5/2013 | Terzioglu et al. |
| 2014/0173180 | A1 | 6/2014 | D'Abreu et al. |
| 2014/0281160 | A1 | 9/2014 | Suzuki et al. |
| 2015/0120993 | A1 | 4/2015 | Higeta et al. |
| 2015/0169409 | A1* | 6/2015 | Cho .................... G06F 11/1088 714/764 |
| 2016/0034354 | A1 | 2/2016 | Hashimoto et al. |
| 2016/0210186 | A1 | 7/2016 | Sato et al. |
| 2017/0046256 | A1 | 2/2017 | Horspool et al. |
| 2017/0123666 | A1 | 5/2017 | Sinclair et al. |
| 2017/0123707 | A1 | 5/2017 | Carey |
| 2018/0232178 | A1 | 8/2018 | Iwaki et al. |
| 2019/0004724 | A1 | 1/2019 | Kanno |

FOREIGN PATENT DOCUMENTS

| | | |
|---|---|---|
| CN | 103635968 A | 3/2014 |
| CN | 104813408 A | 7/2015 |
| CN | 105653202 A | 6/2016 |
| CN | 106489134 A | 3/2017 |
| GB | 2 530 667 A | 3/2016 |
| JP | 2017-054483 A | 3/2017 |

OTHER PUBLICATIONS

Chris Peterson and Amber Huffman, "Solving Latency Challenges with NVM Express SSDs at Scale," Facebook & NVM Express, Jul. 26, 2017, pp. 1-27.

International Search Report and Written Opinion mailed Dec. 20, 2018 cited in corresponding application PCT/IB2018/001039.

Jian Huang et al., "FlashBlox: Achieving Both Performance Isolation and Uniform Lifetime for Virtualized SSDs," 15th USENIX Conference on File and Storage Technologies, Feb. 27-Mar. 2, 2017, pp. 374-390.

Luca Bert and Chris Petersen, "Enhancing SSD Control of NVMe Devices for Hyperscale Applications," Flash Memory Summit, Facebook@Seagate, Aug. 8, 2017, pp. 1-26.

Matias Bjorling, "Open-Channel SSDs Offer the Flexibility Required by Hyperscale Infrastructure," CNEXLABS, Aug. 8, 2017, pp. 1-20.

\* cited by examiner

SSD ARCHITECTURE SUPPORTING LOW LATENCY OPERATION

CROSS-REFERENCE TO RELATED PATENT APPLICATIONS RELATED APPLICATION

This application is a Continuation of U.S. application Ser. No. 17/700,321, filed Mar. 21, 2022, which is a Divisional of U.S. application Ser. No. 15/800,742, filed Nov. 1, 2017 (now U.S. Pat. No. 11,294,594), incorporated herein by reference in its entirety, which claims priority from Provisional Application U.S. Application No. 62/542,108, filed Aug. 7, 2017, incorporated herein by reference in its entirety.

FIELD OF THE INVENTION

This invention generally relates to solid state drive (SSD) architectures, and more particularly, to SSD architectures supporting low latency operation.

BACKGROUND

Conventionally, SSD architectures and designs have primarily focused on obtaining a high average bandwidth or throughput for input and output (I/O) operations (i.e., reading and writing data). Compared to traditional magnetic storage devices such as hard disk drives (HDDs), SSDs are capable of performing I/O operations that are hundreds, if not thousands, of times greater per second as compared to HDDs. Such conventional SSDs are capable of obtaining such high average bandwidth through parallelism in its architecture.

An SSD typically comprises a number of non-volatile memory dies, such as NAND flash memory, that are arranged in groups coupled to channels controlled by a channel controller. For example, 128 non-volatile memory dies are arranged as sixteen groups of eight dies, each group coupled to a channel. A physical storage block from each of the non-volatile memory dies are commonly selected to create logical blocks or superblocks for one or more host devices, such as a computer or storage appliance, to write and read data to and from, respectively. Selecting a physical block from each of the non-volatile memory dies to form superblocks allows parallel access to all of the non-volatile memory dies across all channels, achieving maximum bandwidth or throughput. A die may further be organized into multiple "planes" (each die comprising two, four, or more planes), where each plane may process an I/O operation in parallel.

While such an SSD architecture maximizes the bandwidth or throughput of an SSD, this architecture also suffers from a number of issues that impact I/O latency (i.e., the amount of time it takes to complete an I/O operation). Due to physical limitations of the non-volatile memory dies, only a single physical block per plane per non-volatile memory die can perform an I/O operation at a time, which leads to collisions between I/O operations to different physical blocks of the same plane of the same non-volatile memory die where an I/O operation must wait until the previous operation to a different block in the same plane has completed. Relatedly, because there are multiple non-volatile memory dies per channel controller, there may also be collisions between commands for I/O operations to different superblocks at the channel controller, due to the shared nature of a channel in which only one data transfer may proceed at any time between the controller and any non-volatile memory die, leading to bottlenecks at each channel controller of the SSD.

In addition to I/O operations from hosts, the SSD must perform maintenance operations throughout the lifetime of the SSD, such as garbage collection to consolidate valid data and erase invalid data to create free areas for new data to be written and data reliability operations to read data stored in the non-volatile memory dies and re-write them as necessary to ensure that the data is not lost over time due to the nature of non-volatile memory dies such as NAND flash memory dies. These maintenance operations take place at typically indeterminate times throughout the lifetime of the SSD as needed and last for an indeterminate period of time, which inevitably lead to collisions with host I/O operations at both the channel controllers and the non-volatile memory dies. These collisions, either due to host I/O operations or SSD maintenance operations causes inconsistent and unpredictable SSD latency performance.

For example, a typical host read operation can take anywhere between 70-100 µs to complete absent any collisions. However, if there is a collision, the latency of the read operation may be greatly increased. If the non-volatile memory die is currently being written to, the read operation will collide with the write (program) operation already taking place and will have to wait until the write operation completes before the read operation can be performed. In this instance, the latency of the read operation may be more than doubled to 2500-3000 µs for TLC NAND memory. Even worse, if a maintenance operation is currently being performed, such as garbage collection which requires all three of a read, a write, and an erase operation, the latency of the read operation to a physical block of a non-volatile memory die currently undergoing maintenance may be significantly greater—in the millisecond range to complete the read operation. This problem is further exacerbated in a data center or storage center environment storing data across large numbers of SSDs that are being constantly accessed by multiple host applications (i.e., the SSDs are constantly being written to and read from), greatly increasing the likelihood of collisions between I/O operations and maintenance operations. Given the ever increasing need for storage in data centers and the growing popularity of cloud-based and web-based applications, the inconsistent and unpredictable SSD performance provided by conventional SSD architectures focused on achieving high average bandwidth is no longer sufficient to meet the current demands and requirements of such consumers.

What is needed, therefore, is an improved SSD architecture that supports low latency operation to provide consistent and predictable I/O operation and performance.

BRIEF DESCRIPTION OF THE INVENTION

In one embodiment, a solid state drive (SSD) comprises a plurality of non-volatile memory dies communicatively arranged in one or more communication channels, each of the plurality of non-volatile memory dies comprising a plurality of physical blocks, one or more channel controllers communicatively coupled to the one or more communication channels, respectively, and a memory controller communicatively coupled to the plurality of non-volatile memory dies via the one or more channel controllers, wherein the memory controller is configured to assign (i) the plurality of physical blocks of a first die of the plurality of non-volatile memory dies to only a first region and (ii) the plurality of physical blocks of a second die of the plurality of non-volatile memory dies to only a second region, perform only read operations on the first region in a first operation mode, and perform write operations or maintenance operations on the second region in a second operation mode concurrently with read operations on the first region in the first operation mode. In one embodiment, at least one of the first region and the second region comprises the plurality of physical blocks of each of the non-volatile memory dies in one or more communication channels. In one embodiment, at least one of the first region and the second region comprises the plurality of physical blocks of one or more non-volatile memory dies from each of the one or more communication channels.

In one embodiment, the memory controller is further configured to create one or more namespaces within at least one of the first region and the second region. In one embodiment, the memory controller is further configured to maintain a maintenance counter for each of the first region and the second region, monotonically decrement the maintenance counter when the corresponding region is in the first operation mode, and monotonically increment the maintenance counter when the corresponding region is in the second operation mode. In one embodiment, each of the first region and the second region operates in the first operation mode when the corresponding maintenance counter is above a first threshold, and operates in the second operation mode when the corresponding maintenance counter is below a second threshold. In one embodiment, the memory controller is further configured to maintain a maintenance counter for each of the first region and the second region, monotonically increment the maintenance counter when the corresponding region is in the first operation mode, and monotonically decrement the maintenance counter when the corresponding region is in the second operation mode. In one embodiment, each of the first region and the second region operates in the first operation mode when the corresponding maintenance counter is below a first threshold, and operates in the second operation mode with the corresponding maintenance counter is above a second threshold.

In one embodiment, a method of operating an SSD comprises assigning a first die of a plurality of non-volatile memory die communicatively arranged in one or more communication channels to only a first region, each of the plurality of non-volatile memory dies comprising a plurality of physical blocks, assigning a second die of the plurality of non-volatile memory dies to only a second region, performing only read operations on the first region in a first operation mode, and performing write operations or maintenance operations on the second region in a second operation mode concurrently with read operations on the first region in the first operation mode. In one embodiment, at least one of the first region and the second region comprises the plurality of physical blocks of each of the non-volatile memory dies in one or more communication channels. In one embodiment, at least one of the first region and the second region comprises the plurality of physical blocks of one or more non-volatile memory dies from each of the one or more communication channels. In one embodiment, the method further comprises creating one or more namespaces within at least one of the first region and the second region. In one embodiment, the method further comprises maintaining a maintenance counter for each of the first region and the second region, monotonically decrementing the maintenance counter when the corresponding region is in the first operation mode; and monotonically incrementing the maintenance counter when the corresponding region is in the second operation mode. In one embodiment, the method further comprises operating the first region and the second region in the first operation mode when the corresponding maintenance counter is above a first threshold; and operating the first region and the second region in the second operation mode when the corresponding maintenance counter is below a second threshold. In one embodiment, the method further comprises maintaining a maintenance counter for each of the first region and the second region, monotonically incrementing the maintenance counter when the corresponding region is in the first operation mode, and monotonically decrementing the maintenance counter when the corresponding region is in the second operation mode. In one embodiment, the method further comprises operating the first region and the second region in the first operation mode when the corresponding maintenance counter is below a first threshold, and operating the first region and the second region in the second operation mode when the corresponding maintenance counter is above a second threshold.

DETAILED DESCRIPTION

Figure 1:
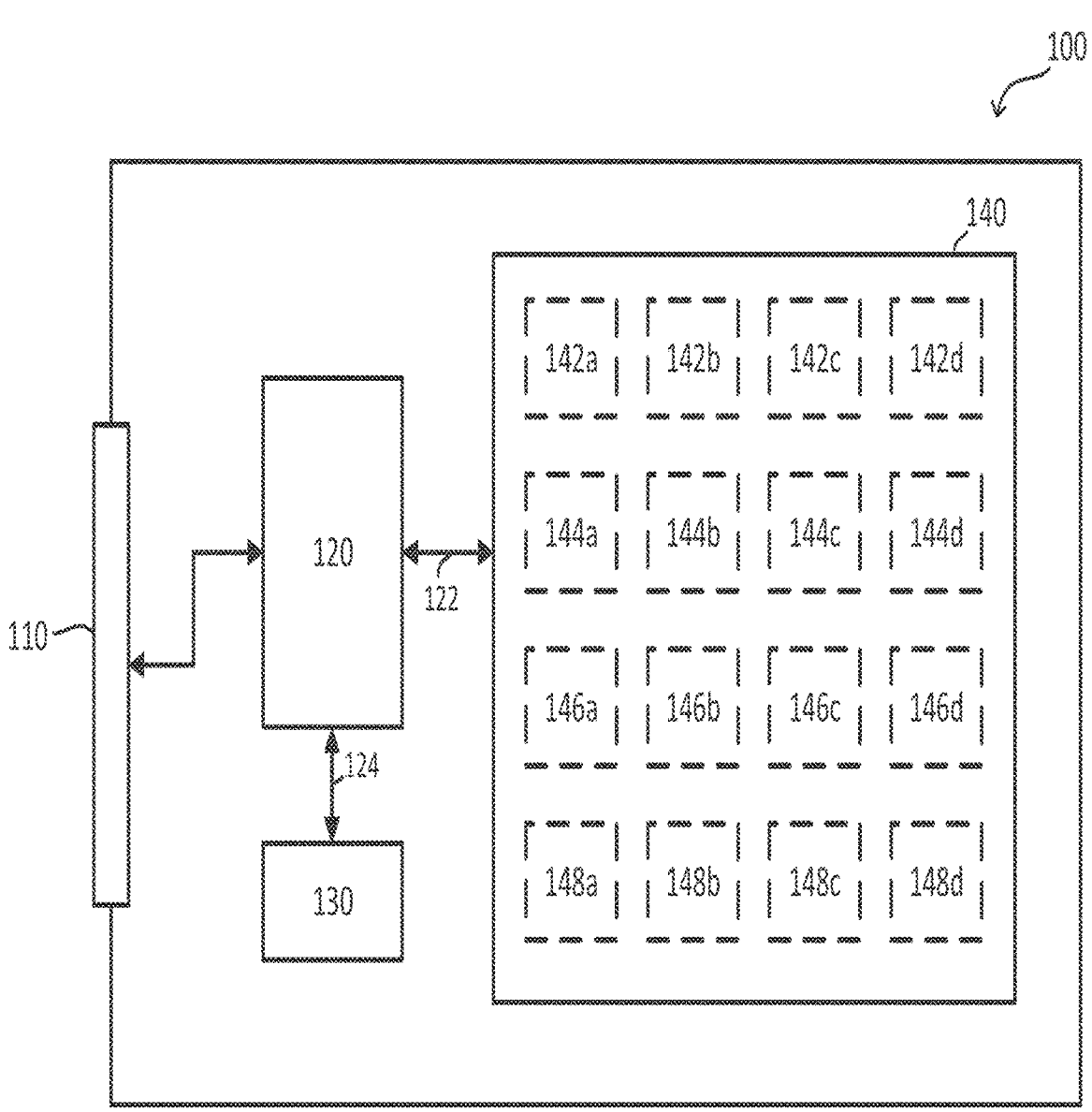
FIG. 1 is a block diagram of the structure of an SSD, according to one embodiment of the invention.

Part 1: I/O Determinism and the SSD Architecture Supporting I/O Determinism for Low Latency Operation FIG. 1 is a block diagram of the structure of an SSD 100, according to one embodiment of the invention. As shown in FIG. 1, an SSD memory controller 120 is in communication with one or more host devices or host applications (not shown) through a host interface 110. The host device may comprise any suitable device, such as a computer or storage appliance. The SSD 100 includes both a volatile memory 130, and an array of non-volatile memory dies 140. The volatile memory device 130 and the array of non-volatile memory dies 140 are in communication 124 and 122, respectively, with the SSD memory controller 120.

The array of non-volatile memory dies 140 comprises non-volatile memory dies 142*a-d*, 144*a-d*, 146*a-d*, and 148*a-d* that may be arranged in one or more channels in communication 122 with the SSD memory controller 120. While 16 non-volatile memory dies 142*a-d*, 144*a-d*, 146*a-d*, and 148*a-d* are shown in FIG. 1, the array of non-volatile memory dies 140 of the SSD 100 may comprise any suitable number of non-volatile memory dies 140 that are arranged in one or more channels in communication 122 with the SSD memory controller 120. In one embodiment, the volatile memory device 130 comprises a volatile memory DRAM buffer. The volatile memory device 130 need not be a single device of a unitary type, and may comprise multiple devices of different types capable of providing a volatile memory buffer for the SSD 100. In one embodiment, the non-volatile memory dies 142*a-d*, 144*a-d*, 146*a-d*, and 148*a-d* comprise NAND flash memory.

Figure 2A:
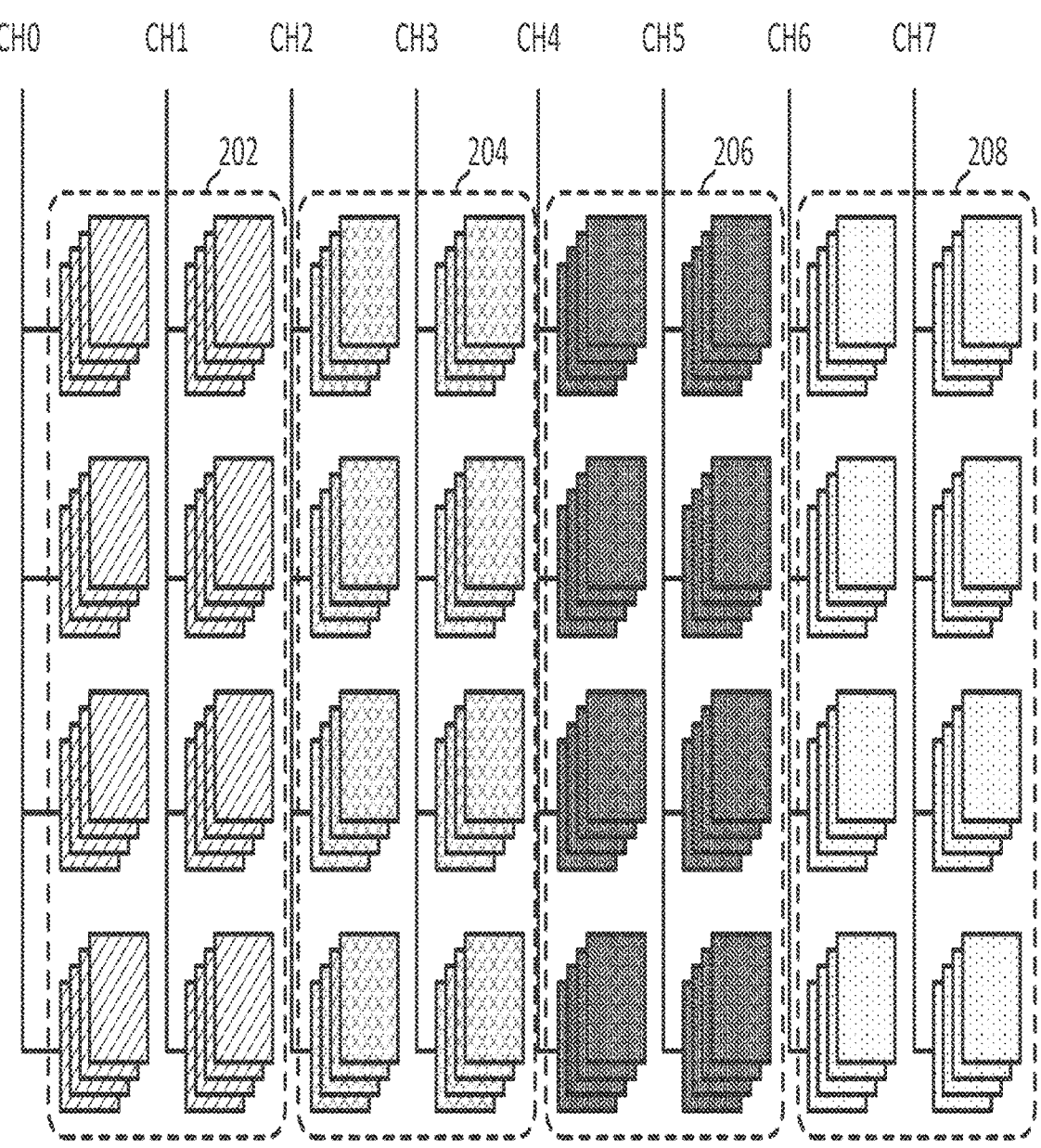
FIG. 2a is a block diagram of an SSD architecture supporting low latency operation, according to one embodiment of the invention.

FIG. 2*a* is a block diagram of an SSD architecture supporting low latency operation, according to one embodiment of the invention. As shown in FIG. 2*a*, 32 non-volatile memory dies are arranged across 8 channels (CH0-CH7), with 4 non-volatile memory dies coupled to each channel. Rather than superblocks formed by selecting a physical block from each of the non-volatile memory dies across all 8 channels as is done in the prior art, the SSD architecture of FIG. 2*a* includes superblocks formed by selecting all of the physical blocks from each of the non-volatile memory dies on the same channel and an adjacent channel (denoted by similar shading). Each of these superblocks forms an isolation region within the SSD that is relatively unaffected by activities in other regions of the SSD. Thus, as shown in FIG. 2*a*, the physical blocks of the non-volatile memory dies on the first two channels (starting from left to right) comprise an isolation region 202, the physical blocks of the non-volatile memory dies in the next two channels comprise an isolation region 204, and so on and so forth for isolation regions 206 and 208.

By configuring the superblocks using the physical blocks from the same non-volatile memory dies in the same channel(s) to form isolation regions, such as shown in FIG. 2*a*, I/O operation collisions at the non-volatile memory dies and the channel controllers can be minimized or avoided altogether, allowing for lower latency, greater predictability, and more consistent I/O performance of the SSD. Of course, configuring the superblocks in the manner shown in FIG. 2*a* decreases the maximum possible throughput of the SSD as compared to the prior art configuration because the isolation regions 202, 204, 206, and 208 of FIG. 2*a* are not leveraging all 8 available channels to achieve maximum parallel access to all of the non-volatile memory dies. However, this tradeoff is offset in the architecture shown in FIG. 2*a* by selecting physical blocks from each of the non-volatile memory dies across two channels per isolation region 202, 204, 206 and 208, thereby leveraging two channel controllers per isolation region to handle host I/O operations.

The selection and arrangement of physical blocks to form isolation regions, as well as the aggregation of isolation regions and the flow of data within the SSD using this architecture is explained in greater detail below.

Figure 2B:
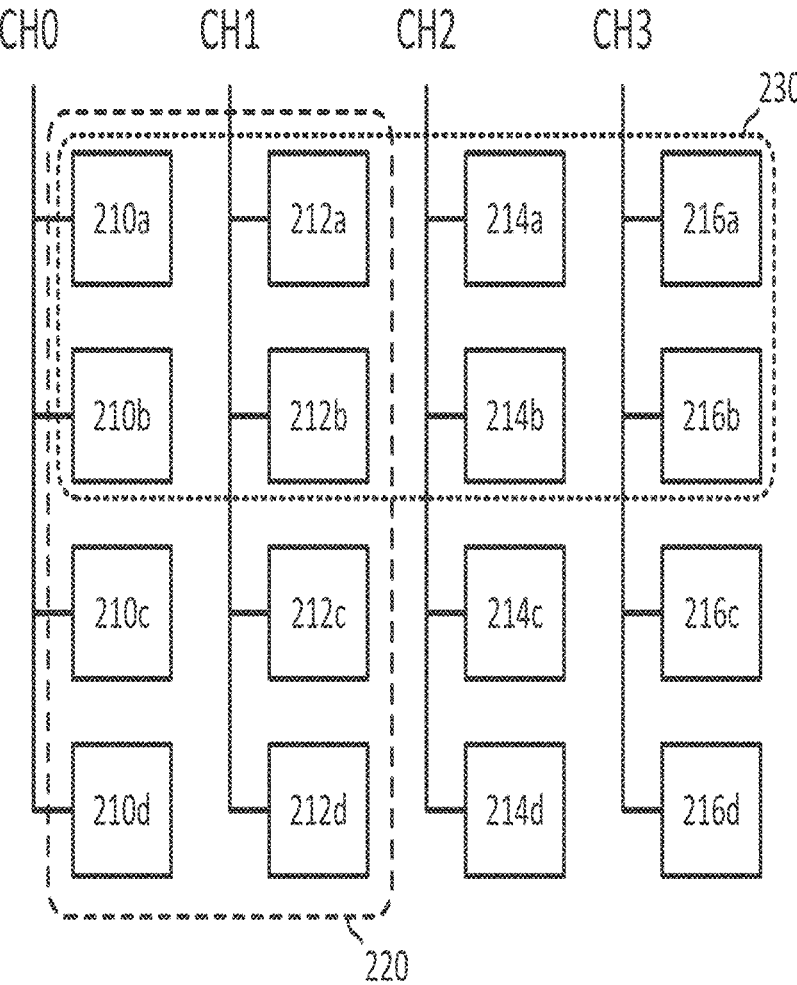
FIG. 2b is a block diagram of two isolation region configurations, according to various embodiments of the present invention.

FIG. 2*b* is a block diagram of two isolation region configurations 220 and 230, according to various embodiments of the present invention. As shown in FIG. 2*b*, 16 non-volatile memory dies 210*a-*210***d*, 212*a-*212***d*, 214*a-*214***d*, and 216*a-*216***d* are arranged across four channels CH0 to CH3, with four non-volatile memory dies per channel. Similar to the configuration shown in FIG. 2*a*, isolation region 220 comprises each of the physical blocks of the non-volatile memory dies 210*a-*210***d* of channel CH0 and the non-volatile memory dies 212*a-*212***d* of channel CH1. Again, as previously explained with respect to FIG. 2*a*, the isolation region 220 minimizes I/O operation collisions at both the non-volatile memory dies 210*a-d* and 212*a-d* and the channel controllers of channels CH0 and CH1 to enable lower latency and more predictable operation at the expense of maximum I/O throughput.

Alternatively, rather than selecting each of the physical blocks of all of the non-volatile memory dies of a channel or multiple channels, such as isolation region 220 shown in FIG. 2*b* or the isolation regions 202, 204, 206 and 208 shown in FIG. 2*a*, an isolation region 230 comprises each of the physical blocks of non-volatile memory dies 210*a* and 210*b* of channel CH0, each of the physical blocks of non-volatile memory dies 212*a* and 212*b* of channel CH1, each of the physical blocks of non-volatile memory dies 214*a* and 214*b* of channel CH2, and each of the physical blocks of non-volatile memory dies 216*a* and 216*b*.

As compared to isolation region 220, isolation region 230 will have improved I/O throughput as it provides parallel access to physical blocks from the non-volatile memory dies across all four channels CH0 to CH3, rather than being limited to two channels CH0 and CH1 in the case of isolation region 220. However, with the physical block configuration of isolation region 230, there may be some I/O operation collisions at the channel controllers of channels CH0-CH3 assuming other regions of the SSD are similarly configured as isolation region 230 (i.e., comprising each of the physical blocks from non-volatile memory dies across channels CH0-CH3), such as an isolation region comprising the physical blocks of non-volatile memory dies 210*c* and 210*d* of channel CH0, the physical blocks of non-volatile memory dies 212*c* and 212*d* of channel CH1, the physical blocks of non-volatile memory dies 214*c* and 214*d* of channel CH2, and the physical blocks of non-volatile memory dies 216*c* and 216*d* of channel CH3. I/O operations to non-volatile memory dies in the isolation region 230 may collide with I/O operations to other non-volatile memory dies of other similarly-configured isolation regions that are on the same channel (i.e., a channel collision), potentially causing some unpredictable I/O performance and higher than expected latencies.

As will be explained in greater detail below, collisions of I/O operations at both the non-volatile memory dies and the channel controllers can be minimized or avoided for SSDs architectures utilizing either the configuration of isolation region 220 or the configuration of isolation region 230 through management of the operation of the isolation regions and the SSD. Moreover, it is not necessary for the SSD architecture to only comprise a single isolation region configuration (i.e., only isolation regions like isolation region 220 or only isolation regions like isolation region 230), and may comprise isolation regions comprising each physical block of the non-volatile memory dies of one or more channels (similar to that of isolation region 220) and isolation regions comprising each physical block of the non-volatile memory dies across multiple channels (similar to that of isolation region 230).

Figure 3:
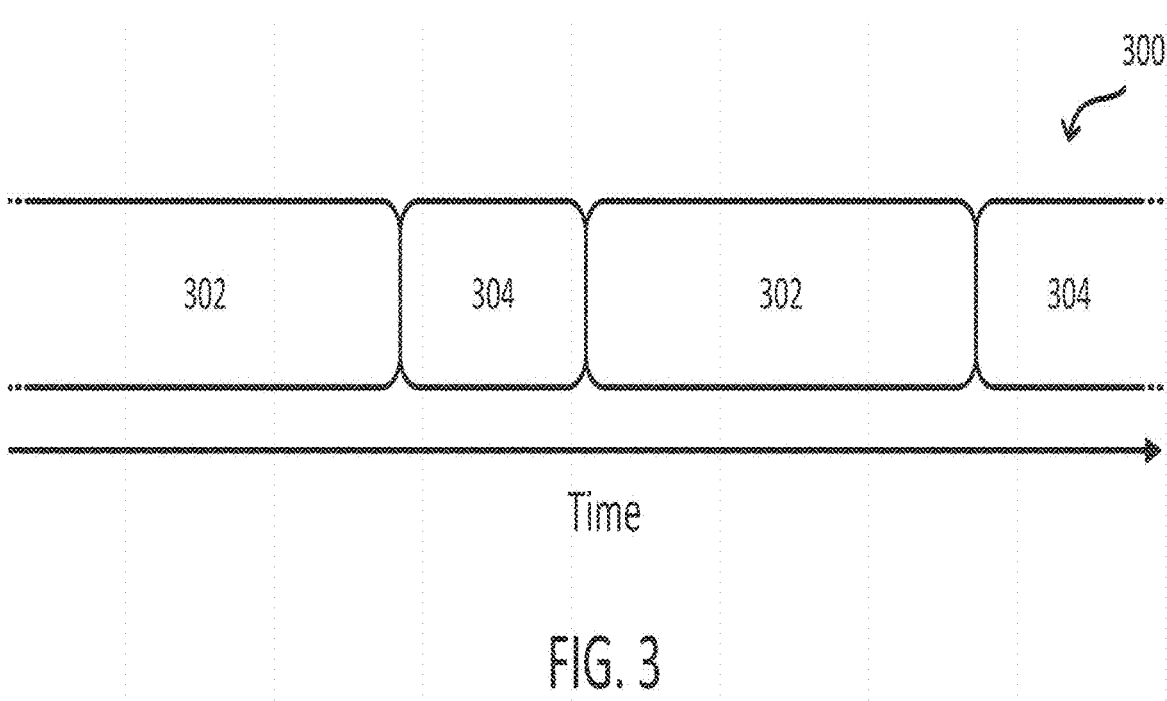
FIG. 3 is a timing diagram of an operation of an SSD architecture supporting low latency operation, according to one embodiment of the invention.

FIG. 3 is a timing diagram 300 of an operation of an SSD architecture supporting low latency operation, according to one embodiment of the invention. As shown in FIG. 3, an isolation region according to the various configurations shown and described in FIGS. 2*a* and 2*b* operates in two distinct modes over a period of time-a deterministic mode 302 and a non-deterministic or maintenance mode 304. In the deterministic mode 302, the isolation region performs only read operations, which as previously explained, are completed relatively quickly with minimal latency (e.g., between 60 μs to 100 μs typically for TLC NAND flash memory). In one embodiment, when an isolation region is in the deterministic mode 302 write commands for the isolation region are queued in the memory controller of the SSD until the isolation region enters the non-deterministic mode 304. In another embodiment, the host device is aware that the isolation region is in the deterministic mode 302 and will not issue write commands to the isolation region until the isolation region enters the non-deterministic mode 304.

Because the isolation region comprises all of the physical blocks of a given non-volatile memory die, the read operations during the deterministic mode 302 will not be affected by other I/O operations and maintenance operations in other isolation regions within the SSD at the non-volatile memory die level. Moreover, if the isolation region is configured in the same manner as isolation region 220 shown in FIG. 2*b* or isolation regions 202-208 as shown in FIG. 2*a*, then channel controller collisions are also avoided as the isolation region will have dedicated channel controller(s) for the non-volatile memory dies. Thus, when operating in the deterministic mode 302, the I/O performance of the isolation region will be deterministic, with read operations completing with minimal latency in this mode.

As read operations are performed in the isolation region during the deterministic mode 302, the need to perform maintenance operations on the isolation region will correspondingly increase. Additionally, there may be an accumulation of write operations pending at the host application for the isolation region (if only read operations are performed during the deterministic mode 302). As such, after a period in the deterministic mode 302, the isolation region will enter the non-deterministic mode 304 once a threshold level of maintenance tasks become necessary. In the non-deterministic mode 304, the isolation region will perform maintenance tasks and write operations. While it is possible, it is not necessary for all of the maintenance tasks and write operations to be performed before the isolation region re-enters the deterministic mode 302. In one embodiment, the isolation region may enter the deterministic mode 302 from the non-deterministic mode 304 once a threshold level of maintenance tasks have been completed.

In this manner, the isolation region will toggle back-and-forth between the deterministic mode 302 and the non-deterministic mode 304. The deterministic and non-deterministic operations of the isolation region, as well as coordination between multiple isolation regions within and external to an SSD will be explained in greater detail below.

Figure 4:
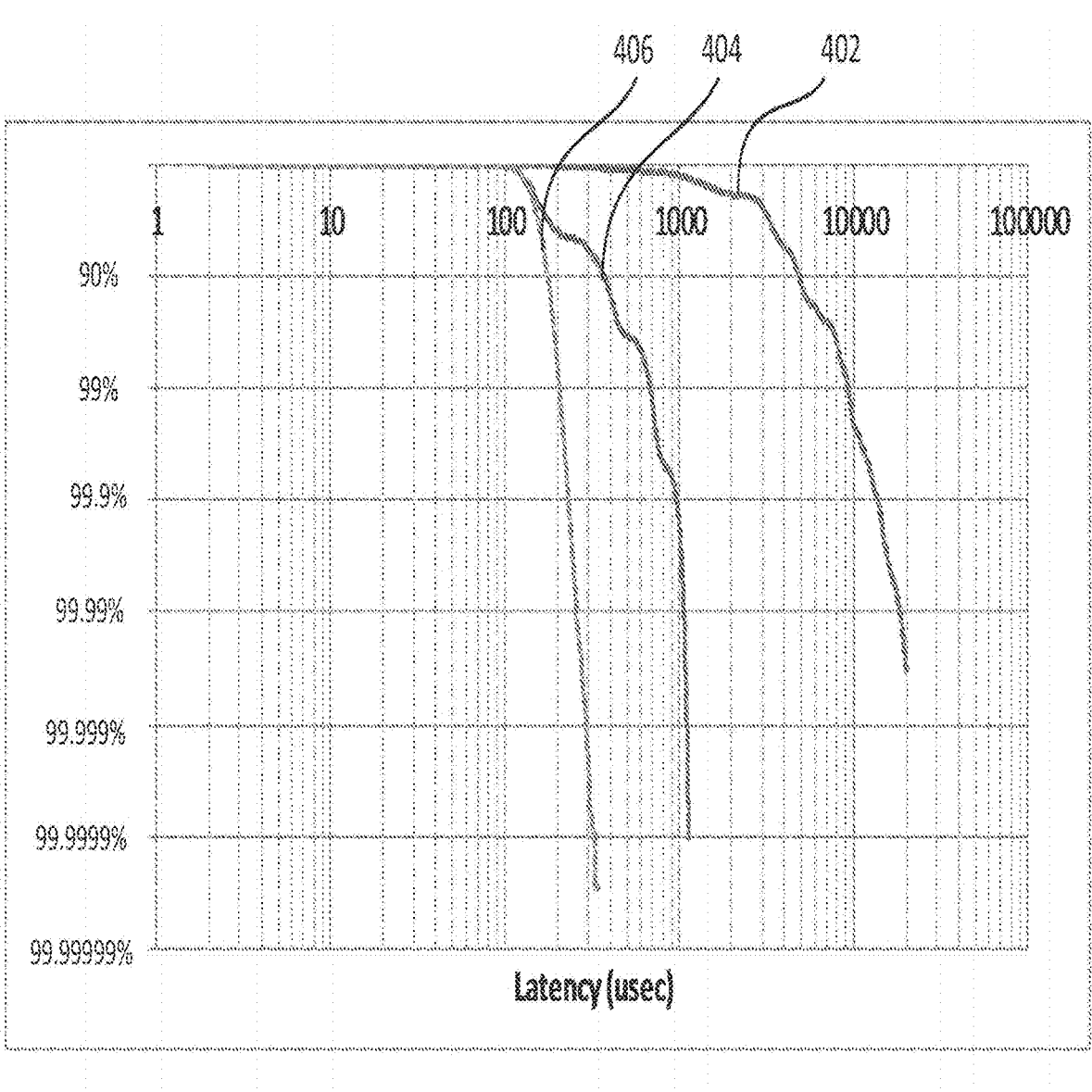
FIG. 4 is a plot of read latencies corresponding to two SSD architectures supporting low latency operation according to various embodiments of the present invention.

FIG. 4 is a plot of read latencies corresponding to two SSD architectures supporting low latency operation according to various embodiments of the present invention. As shown in FIG. 4, three read latency plots 402, 404, and 406 are depicted. Read latency plot 402 corresponds to the SSD architecture of the prior art, where a physical block from each non-volatile memory die across all channels is picked to form a logical block (a superblock). Read latency plot 404 corresponds to the SSD architecture shown in FIG. 2*b* where the isolation regions of the SSD comprise each physical block of non-volatile memory dies across all channels, similar to the configuration of isolation region 230. Finally, read latency plot 406 corresponds to the SSD architecture shown in FIGS. 2*a* and 2*b*, whereby the isolation regions of the SSD comprise each physical block of all the non-volatile memory dies from one or more channels, similar to the configuration of isolation regions 202-208 shown in FIG. 2*a* or isolation region 220 shown in FIG. 2*b*.

The data represented by all three read latency plots 402, 404, and 406 were measured using the same test system and parameters (i.e., same processor, motherboard, operating system, and workload). For the read latency plots 404 and 406, the SSD architecture comprises four isolation regions, with one isolation region in deterministic mode (i.e., read operations only) while the remaining three isolation regions are all performing write operations only. The read latency plots 404 and 406 are generated by measuring the read operation latencies of the isolation region in deterministic mode.

As shown in FIG. 4, for read latency plot 402, the read latency of 90 percent of read operations are spread across a wide range of latencies, from about 100 μs to 5 ms. The latency for the $99^{th}$ percentile of read operations further increases to about 10 ms, and gets much worse for the $99.9^{th}$ percentile and $99.99^{th}$ percentile of read operations reaching nearly 20 ms to complete. While a 10 ms to 30 ms read operation may appear to have a relatively low chance of occurring (i.e., one out of every thousand to ten thousand read operations), a typical SSD will have tens or hundreds of thousands of I/O operations occurring per second which means that during every second of operation there is a strong possibility that multiple read operations will take 10 ms to 30 ms. The dramatically increasing latencies of the read latency plot 402 are attributable to read operations colliding with other I/O operations and maintenance operations at both the non-volatile memory die level and at the channel controllers due to the SSD architecture of the prior art, as previously explained in the background. Further, in datacenters where operations are at "hyperscale" (i.e., an operation such as serving a web page is spread out as thousands of sub-operations among thousands of servers, with the results of the thousands of sub-operations aggregated), a one-in-thousands chance of a latency outlier means that every operation will be delayed.

The read latency plot 404 shows a marked improvement over the read latency plot 402, with the read latency of 90 percent of read operations being less than about 400 μs, and the read latency of 99.99 percent of read operations being less than about 1100 μs. The read latency plot 404 shows about a fifteen times (15×) improvement over the read latency plot 402, with a much smaller range of variation. The read latency plot 404 shows that read operations are almost guaranteed to be completed within about 1100 μs, with the majority of read operations (99 percent) completing within about 700 μs. Thus, the SSD architecture corresponding to the read latency plot 404, in which the isolation regions of the SSD comprise each physical block of non-volatile memory dies across all channels, similar to the configuration of isolation region 230 of FIG. 2*b*, provides for much lower read latency operation and more predictable, deterministic, operation as compared to the SSD architecture of the prior art.

However, as shown in the read latency plot 404, there still is an increase in read latency at higher percentiles of operation. The increase in read latency is attributable to collisions at the channel controller due to the configuration of the isolation regions of this SSD architecture (i.e., the isolation regions of the SSD comprise each physical block of non-volatile memory dies across all channels, similar to the configuration of isolation region 230 of FIG. 2b). As previously explained, with this SSD architecture read operations to the isolation region in the deterministic mode may be queued up behind write operations to other isolation regions at the channel controller level as multiple isolation regions share the same channel controller, and so the read operations to the isolation region in the deterministic mode must wait for those operations to complete before being executed.

Read latency plot 406 continues the trend of improving read latencies with the read latency of 90 percent of read operations between about 100 μs and 180 μs. The $99^{th}$ percentile, $99.9^{th}$ percentile, and $99.99^{th}$ percentile read latencies reach a maximum at about 200 μs, 220 μs, and 280 μs, respectively, tapering off at about a little more than 300 μs in the $99.9999^{th}$ percentile of read operations. The read latency plot 406 shows a more than fifty times (50x) improvement over the read latency plot 402 and an even smaller range of variation as compared to the read latency plot 404, with 99.99999 percent of read operations completing in between about 100 μs and 300 μs. The SSD architecture corresponding to the read latency plot 406 has improved low latency operation and deterministic behavior compared to the SSD architecture corresponding to the read latency plot 404, which is already greatly improved over the SSD architecture of the prior art corresponding to the read latency plot 402 as explained above, because the SSD architecture corresponding to the read latency plot 406 does not spread multiple isolation regions across a given channel, thus avoiding collisions at the channel controller level as well as the non-volatile memory die level.

As such, similar to the SSD architecture corresponding to the read latency plot 404, the SSD architecture corresponding to the read latency plot 406 also provides for low latency operation and predictable, deterministic, operation as compared to the SSD architecture of the prior art.

Figure 5A:
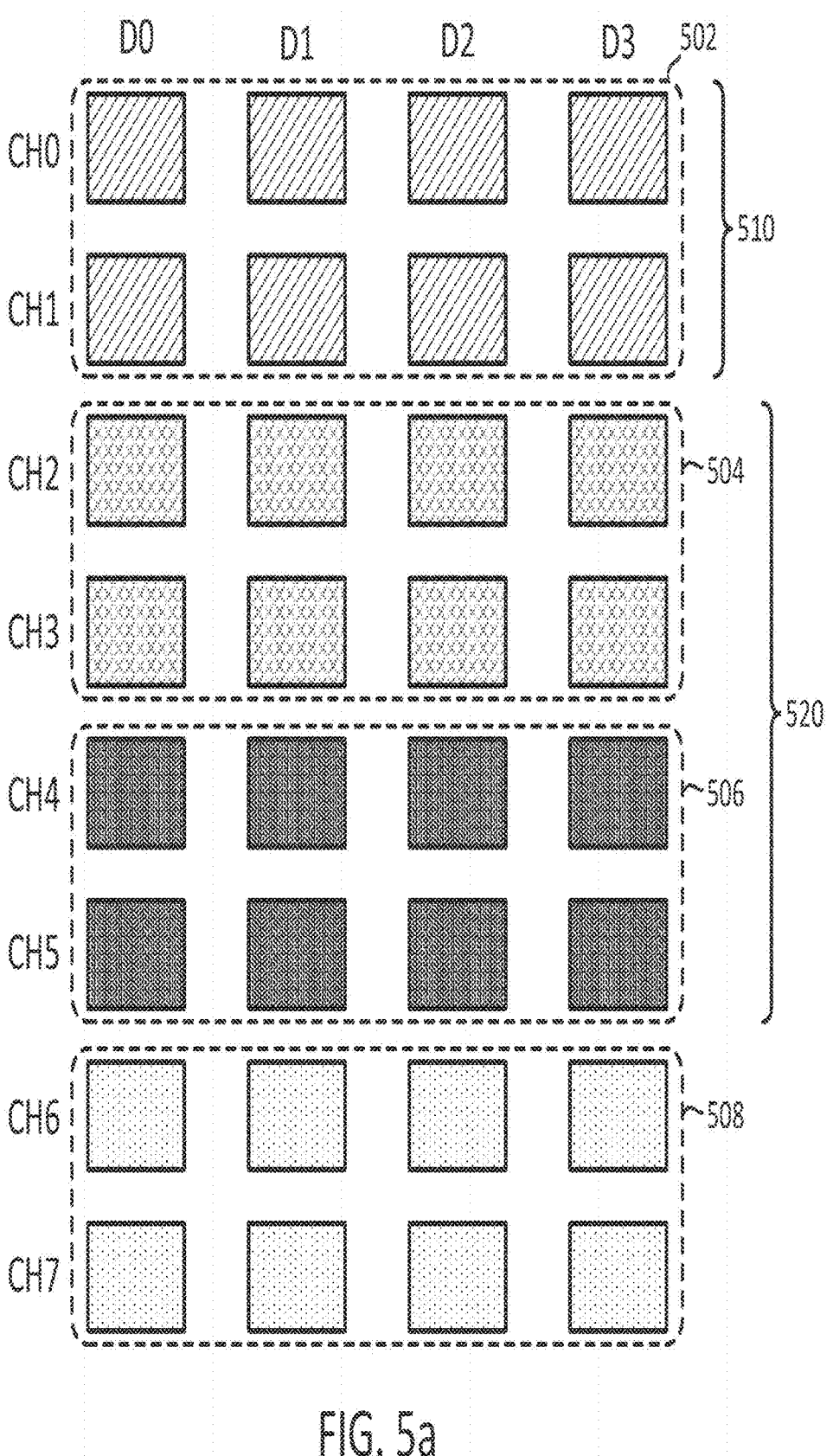
FIGS. 5a and 5b are block diagrams of allocations of isolation regions within an SSD, according to various embodiments of the invention.

Part 2: Isolation Regions, Namespaces, and the Flow of Data Within the SSD Architecture FIG. 5a is a block diagram of a plurality of superblocks in a non-volatile memory array of an SSD, according to one embodiment of the invention. The non-volatile memory array of FIG. 5a includes eight channels (CH0-CH7) with four non-volatile memory dies (D0-D3) coupled to each channel by a channel bus (not shown). Each non-volatile memory die includes a plurality of physical blocks (not shown). During the initial boot up of the SSD, the firmware mapped the physical blocks of the non-volatile memory array into four superblocks 502, 504, 506, and 508. Each of superblocks 502, 504, 506, and 508 is a logical block that has been assigned a plurality of physical blocks in the non-volatile memory array. Superblock 502 includes all physical blocks on dies D0-D3 of channels CH0 and CH1. Superblock 504 includes all physical blocks on dies D0-D3 of channels CH2 and CH3. Superblock 506 includes all physical blocks on dies D0-D3 of channels CH4 and CH5. Superblock 508 includes all physical blocks on dies D0-D3 of channels CH6 and CH7. Each of superblocks 502, 504,

506, and 508 has an identical number of physical blocks, which in the FIG. 5a embodiment provides 512 GB (about 0.5 TB) of storage capacity. Although each superblock in the FIG. 5a embodiment includes all non-volatile memory dies on two channels, a superblock including all of the non-volatile memory dies on any number of channels is within the scope of the invention.

During the initial boot up of the SSD, the firmware also assigned each of superblocks 502, 504, 506, 508 to an isolation region. An isolation region can contain one or more superblocks and each superblock can belong to only one isolation region. For example, in one embodiment the firmware assigns superblock 502 to an isolation region 510 and assigns superblock 504 and superblock 506 to an isolation region 520. In this embodiment, isolation region 510 has a storage capacity of 512 GB and the firmware controls maintenance operations such as garbage collection and reliability operations for the physical blocks assigned to isolation region 510 independently from maintenance operations for all other isolation regions in the non-volatile memory array. For example, during garbage collection a page of valid data in a physical block that is to be erased is moved to another physical block within isolation region 510. In this embodiment, isolation region 520 has a storage capacity of 1 TB (the 512 GB storage capacity of superblock 504 plus the 512 GB storage capacity of superblock 506). The firmware controls maintenance operations for the physical blocks assigned to isolation region 520 independently from maintenance operations for all other isolation regions in the non-volatile memory array. As each of superblocks 502, 504, 506, and 508 has two dedicated channels, I/O operations and maintenance operations on one of superblocks 502, 504, 506, 508 do not introduce any delay in I/O operations on any other of superblocks 502, 504, 506, 508.

Figure 5B:
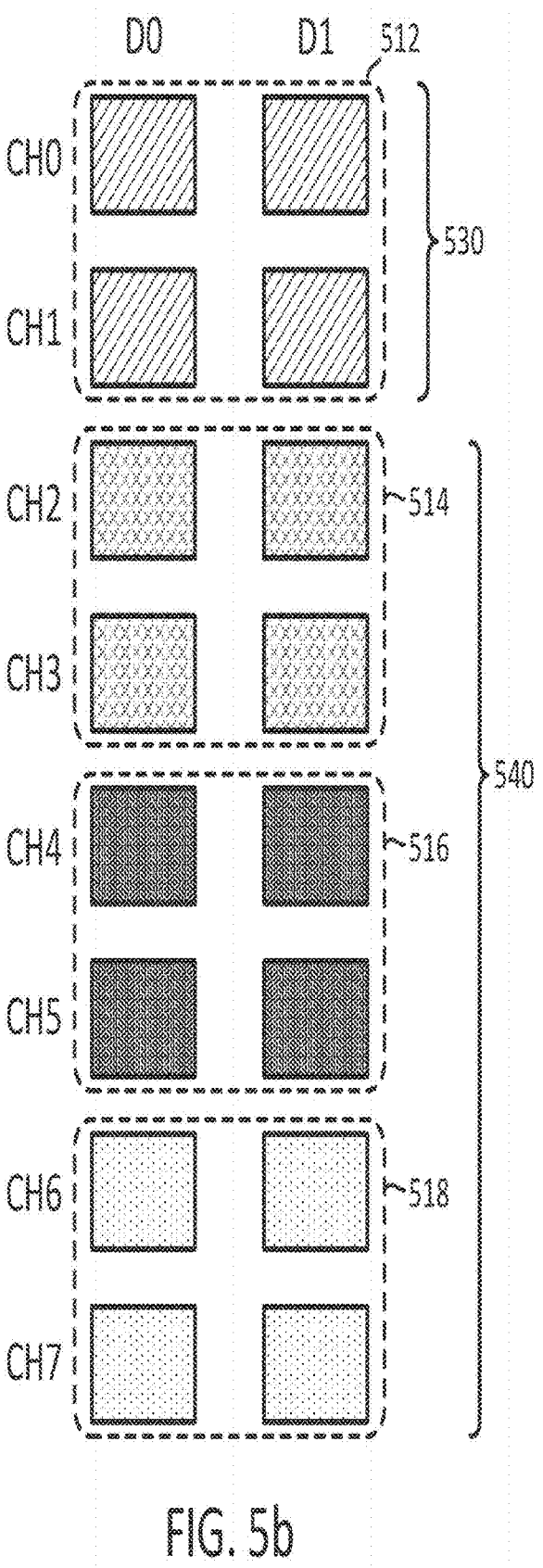

FIG. 5b is a block diagram of a plurality of superblocks in a non-volatile memory array of an SSD, according to one embodiment of the invention. The non-volatile memory array of FIG. 5b includes eight channels (CH0-CH7) with two non-volatile memory dies (D0-D1) coupled to each channel by a channel bus (not shown). Each non-volatile memory die includes a plurality of physical blocks (not shown). During the initial boot up of the SSD, the firmware mapped the physical blocks of the non-volatile memory array into four superblocks 512, 514, 516, and 518. Each of superblocks 512, 514, 516, and 518 is a logical block that has been assigned a plurality of physical blocks in the non-volatile memory array. Superblock 512 includes all physical blocks on non-volatile memory dies D0-D1 of channels CH0 and CH1. Superblock 514 includes all physical blocks on non-volatile memory dies D0-D1 of channels CH2 and CH3. Superblock 516 includes all physical blocks on non-volatile memory dies D0-D1 of channels CH4 and CH5. Superblock 518 includes all physical blocks on non-volatile memory dies D0-D1 of channels CH6 and CH7. Each of superblocks 512, 514, 516, and 518 has an identical number of physical blocks, which in the FIG. 5b embodiment provides 256 GB (about 0.25 TB) of storage capacity.

During the initial boot up of the SSD, the firmware also assigned each of superblocks 512, 514, 516, 518 to an isolation region. An isolation region can contain one or more superblocks and each superblock can belong to only one isolation region. For example, in one embodiment the firmware assigns superblock 512 to an isolation region 530 and assigns superblock 514, superblock 516, and superblock 518 to an isolation region 540. In this embodiment, isolation region 530 has a storage capacity of 256 GB and isolation region 530 has a storage capacity of 256 GB and isolation region 540 has a storage capacity of 768 GB (the 256 GB storage capacity of each of superblock 514, superblock 516, and superblock 518).

Figures 5C, 5D, 5E:
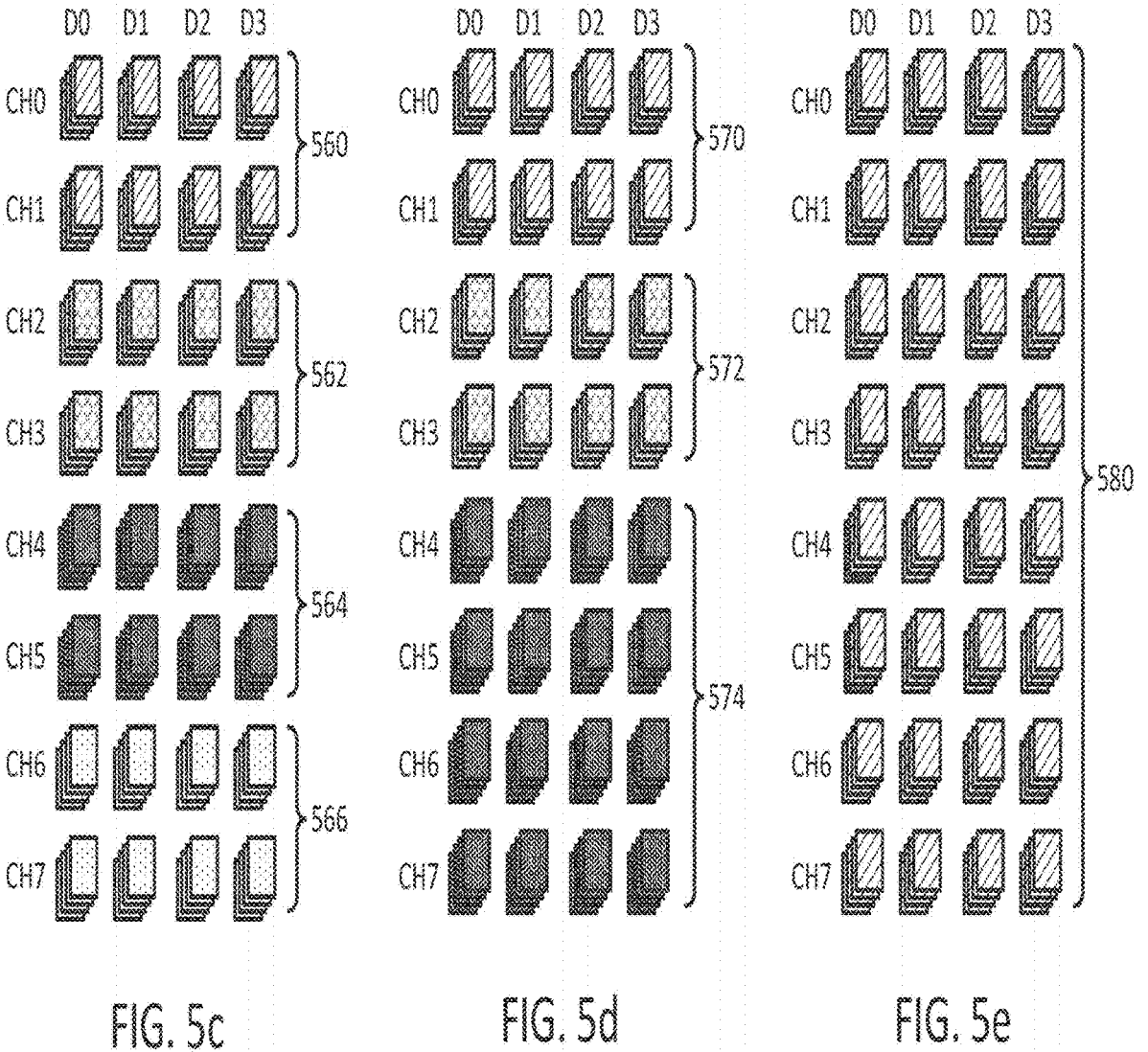
FIGS. 5c-5e are block diagrams of various configurations of isolation regions within an SSD, according to various embodiments of the invention.

As described above in conjunction with FIGS. 5a and 5b, the firmware of the SSD creates a plurality of superblocks of uniform size and then allocates the superblocks to create isolation regions of a variety of sizes. In this fashion the total storage capacity of an SSD can be organized into one or more isolation regions in various configurations to satisfy different users' needs. FIGS. 5c-5e are block diagrams of various configurations of superblocks and isolation regions within an SSD, according to various embodiments of the invention. The non-volatile memory array of the SSD of FIG. 5c includes four isolation regions 560, 562, 564, and 566 where each isolation region is comprised of one super-block that includes all physical blocks on all non-volatile memory dies coupled to two channels. The non-volatile memory array of the SSD of FIG. 5d includes three isolation regions 570, 572, and 574. Each of isolation regions 570 and 572 is comprised of one superblock that includes all physical blocks on all non-volatile memory dies coupled to two channels: isolation region 570 includes all physical blocks on non-volatile memory dies D0-D3 of channels CH0 and CH1 and isolation region 572 includes all physical blocks on non-volatile memory dies D0-D3 of channels CH2 and CH3. Isolation region 574 is comprised of two superblocks, a first superblock that includes all physical blocks on non-volatile memory dies D0-D3 of channels CH4 and CH5 and a second superblock that includes all physical blocks on non-volatile memory dies D0-D3 of channels CH6 and CH7. The non-volatile memory array of the SSD of FIG. 5e includes one isolation region 580 that includes four superblocks.

Figure 6:
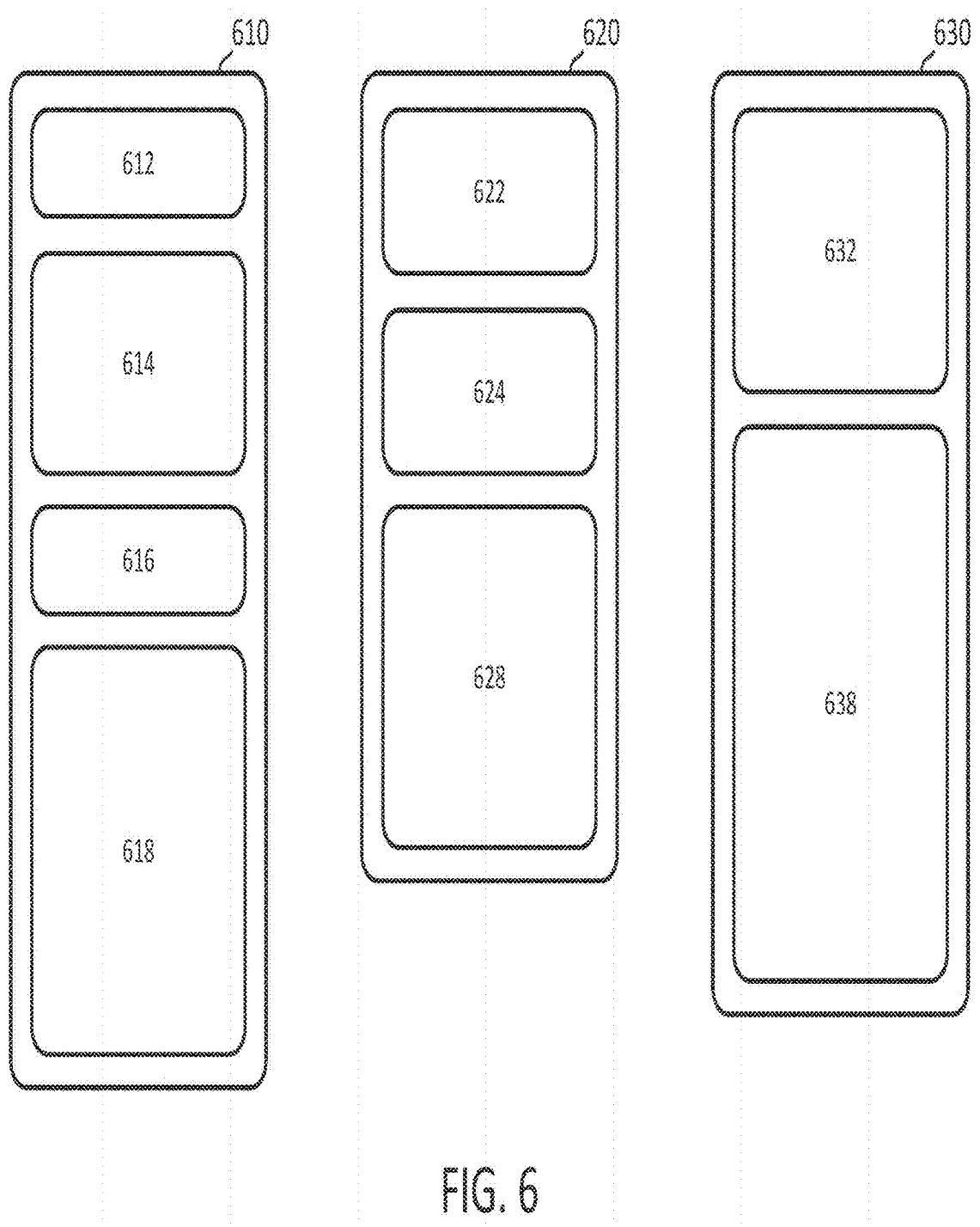
FIG. 6 is a block diagram of various configurations of namespaces within isolation regions, according to one embodiment of the invention.

FIG. 6 is a block diagram of various configurations of namespaces within isolation regions, according to one embodiment of the invention. In one embodiment, each isolation region in an SSD is configured as a namespace. For example, a 4 TB SSD can be configured as four 1 TB isolation regions where each 1 TB isolation region is defined as a single 1 TB namespace. But in other embodiments namespaces are defined as a subset of the physical blocks allocated to an isolation region, as shown in FIG. 6. An isolation region 610 of an SSD includes a namespace 612, a namespace 614, a name space 616, and an unallocated portion 618 of physical blocks. An isolation region 620 of the SSD includes a namespace 622, a namespace 624, and an unallocated portion 628 of physical blocks. An isolation region 630 of the SSD includes a namespace 632 and an unallocated portion 638 of physical blocks. To maintain the advantages of isolation regions, each of namespaces 612, 614, 616, 622, 624, and 632 is contained within a single isolation region. For example, maintenance operations such as garbage collection occurring in namespace 612 of isolation region 610 will not affect read operations in namespace 632 of isolation region 630. Each of unallocated portions 618, 628, and 638 can be allocated to one or more namespaces within its corresponding isolation region 610, 620, and 630, respectively.

Figure 7:
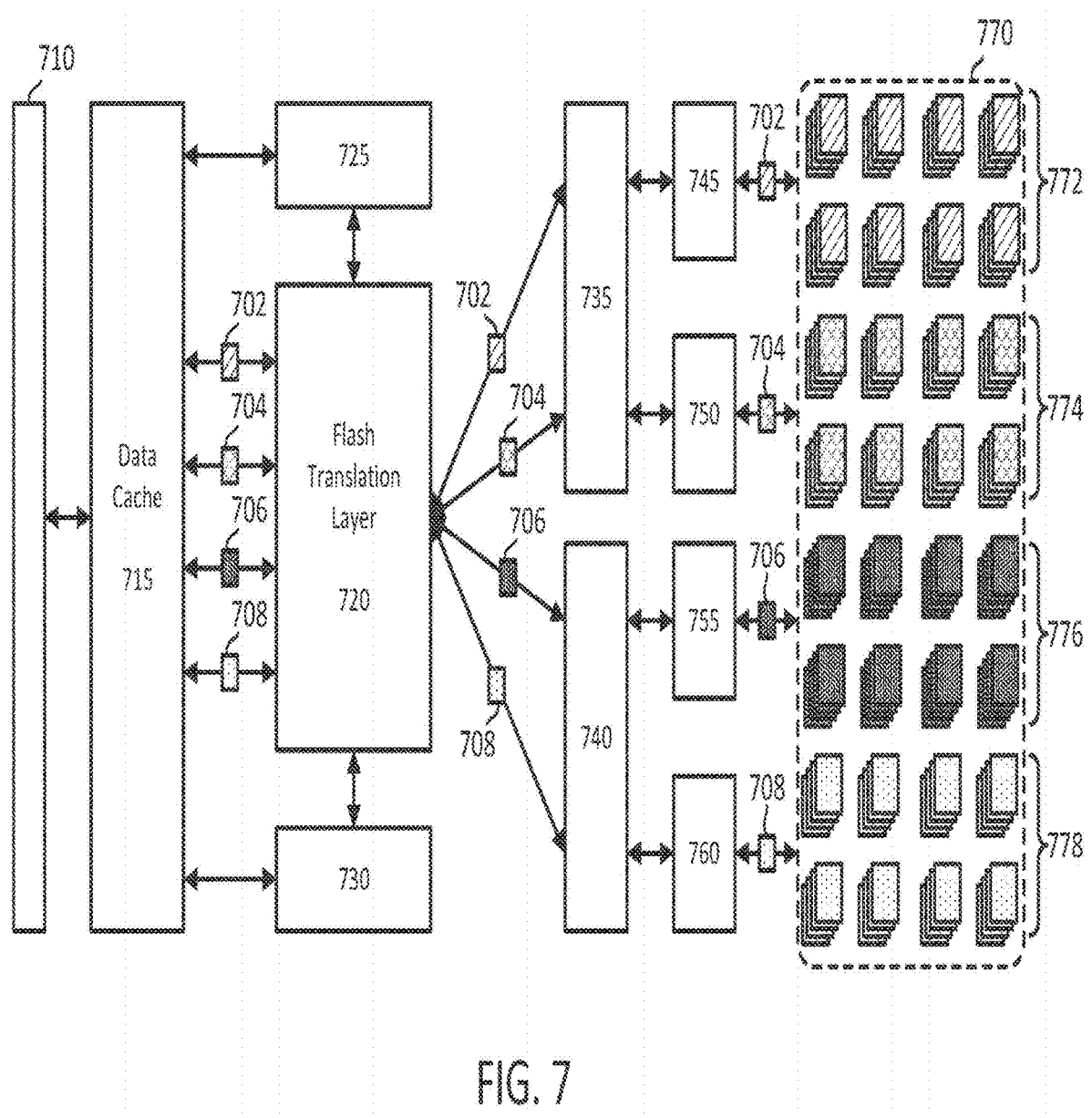
FIG. 7 is a block diagram of the flow of data within an SSD architecture supporting low latency operation, according to one embodiment of the invention.

FIG. 7 is a block diagram of the flow of data within an SSD architecture supporting low latency operation, according to one embodiment of the invention. The SSD architecture includes, but is not limited to, a host interface layer 710, a data cache 715, a flash manager layer 725, a flash translation layer 720, an address map table 730, a flash interface layer 735, a flash interface layer 740, four dual-channel controllers 745, 750, 755, and 760, and a non-volatile memory array 770. Non-volatile memory array 770 includes an isolation region 772, an isolation region 774, an isolation region 776, and an isolation region 778. Each of isolation regions 772, 774, 776, and 778 comprises a superblock that includes all of the physical blocks on all of the non-volatile memory dies coupled to two channels. Address map table 730 stores the assignment of addresses of physical blocks in non-volatile memory array 770 to the logical superblocks and isolation regions. Dual channel controller 745 manages communications over the two channels of isolation region 772, dual channel controller 750 manages communications over the two channels of isolation region 774, dual channel controller 755 manages communications over the two channels of isolation region 776, and dual channel controller 760 manages communications over the two channels of isolation region 778. In the FIG. 7 embodiment, each of isolation regions 772, 774, 776, and 778 corresponds to a namespace. In other embodiments the non-volatile memory array can include other numbers of channels such as four or sixteen, and the SSD architecture can include single channel controllers, one for each channel of the non-volatile memory array.

The four isolation regions 772, 774, 776, and 778 of non-volatile memory array 770 allow the SSD to manage the exchange of data between one or more host devices or applications (not shown) and non-volatile memory array 770 as four independent "data pipes" such that data exchanges between a host application and one isolation region do not interfere with data exchanges between another host application and a different isolation region. Data cache 715, which is a set of memory locations in a volatile memory such as a DRAM of the SSD, caches commands and data for each isolation region independently. Flash translation layer 720 manages data 702 written to or read from isolation region 772, data 704 written to or read from isolation region 774, data 706 written to or read from isolation region 776, and data 708 written to or read from isolation region 778 independently from each other. For example, data 702 to be written to isolation region 772 is routed by flash translation layer 720 to flash interface layer 735 and dual channel controller 745. Similarly, data 706 read from isolation layer 776 is routed through dual channel controller 755 and flash interface layer 740, and flash translation layer 720 causes data 706 to be stored in the appropriate area of data cache 715.

Figure 8:
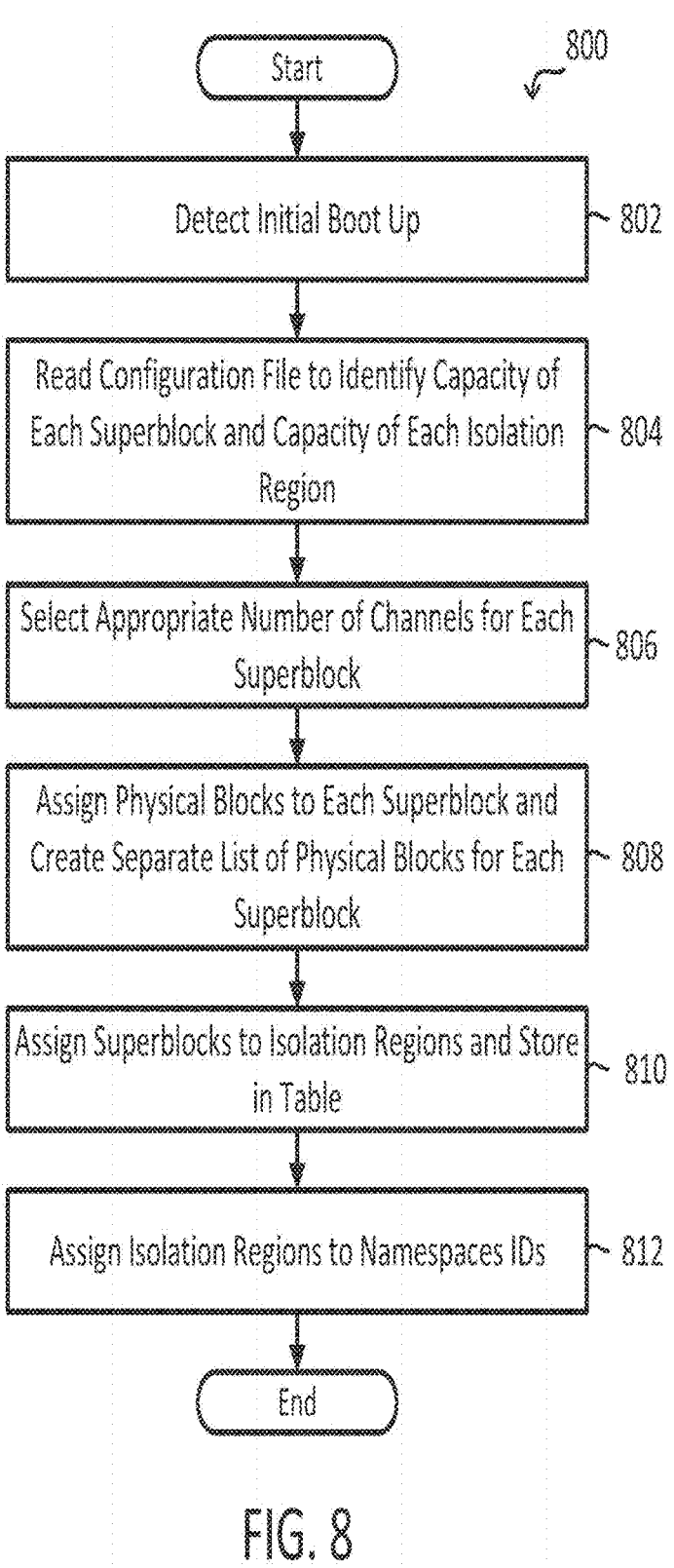
FIG. 8 is a flowchart of method steps for configuring isolation regions and namespaces within an SSD, according to one embodiment of the invention.

FIG. 8 is a flowchart of method steps for creating super-blocks and isolation regions in a non-volatile memory array of an SSD, according to one embodiment of the invention. In a step 802, firmware of the SSD detects that the SSD is being booted or started up for the first time (i.e., the initial boot up). In a step 804, the firmware reads a configuration file that was previously programmed into the firmware to identify the capacity of each superblock and each isolation region to be created in the non-volatile memory array. The capacity of each superblock is defined by the SSD manufacturer and varies based on the total storage capacity of the SSD, e.g., 1 TB, 2 TB, or 4 TB. The capacity of each isolation region defined in the configuration file can be customized to satisfy a user's requirements. For example, a user may want to create a plurality of isolation regions of equal size, or may want to create a plurality of isolation regions where each isolation region is of a different size. In a step 806, the firmware selects the appropriate number of channels for each superblock. The appropriate number of channels may depend on the hardware architecture of the SSD. In one embodiment, the firmware selects two channels for each superblock. In a step 808, the firmware assigns physical blocks of the non-volatile memory array to each superblock to satisfy the superblock requirements set forth in the configuration file and creates a separate list of physical blocks for each logical superblock. In one embodiment the firmware selects two adjacent channels and assigns each physical block of each non-volatile memory die on those two channels to a first superblock. The firmware then selects the next two adjacent channels and assigns each physical block of each non-volatile memory die on those two channels to a second superblock. The firmware continues in this fashion until all of the physical blocks of the non-volatile memory array have been assigned to a superblock. The firmware creates a list of the addresses of the physical blocks assigned to each superblock and stores these separate lists in an address mapping table.

In a step 810, the firmware assigns superblocks to isolation regions and stores the assignments in a table. The firmware assigns superblocks to isolation regions so as to satisfy the isolation region capacities set forth in the configuration file. Generally, each isolation region includes one or more superblocks. For example, in one embodiment the firmware assigns one superblock to each of a plurality of isolation regions such that the number of isolation regions equals the number of superblocks; such an embodiment is shown in FIG. 5c. In another embodiment, the firmware assigns one superblock to a first isolation region, one superblock to a second isolation region, and two superblocks to a third isolation region; such an embodiment is shown in FIG. 5d. In an optional step 812, the firmware assigns isolation regions to namespace identifiers. In one embodiment, the firmware assigns each isolation region to a separate namespace identifier, such that the number of namespaces in the SSD matches the number of isolation regions. In another embodiment, namespaces are defined at some time after the initial boot up of the SSD. As described above in conjunction with FIG. 6, multiple namespaces can be defined within a single isolation region.

Part 3: Low Latency Operation of SSDs

Figure 9:
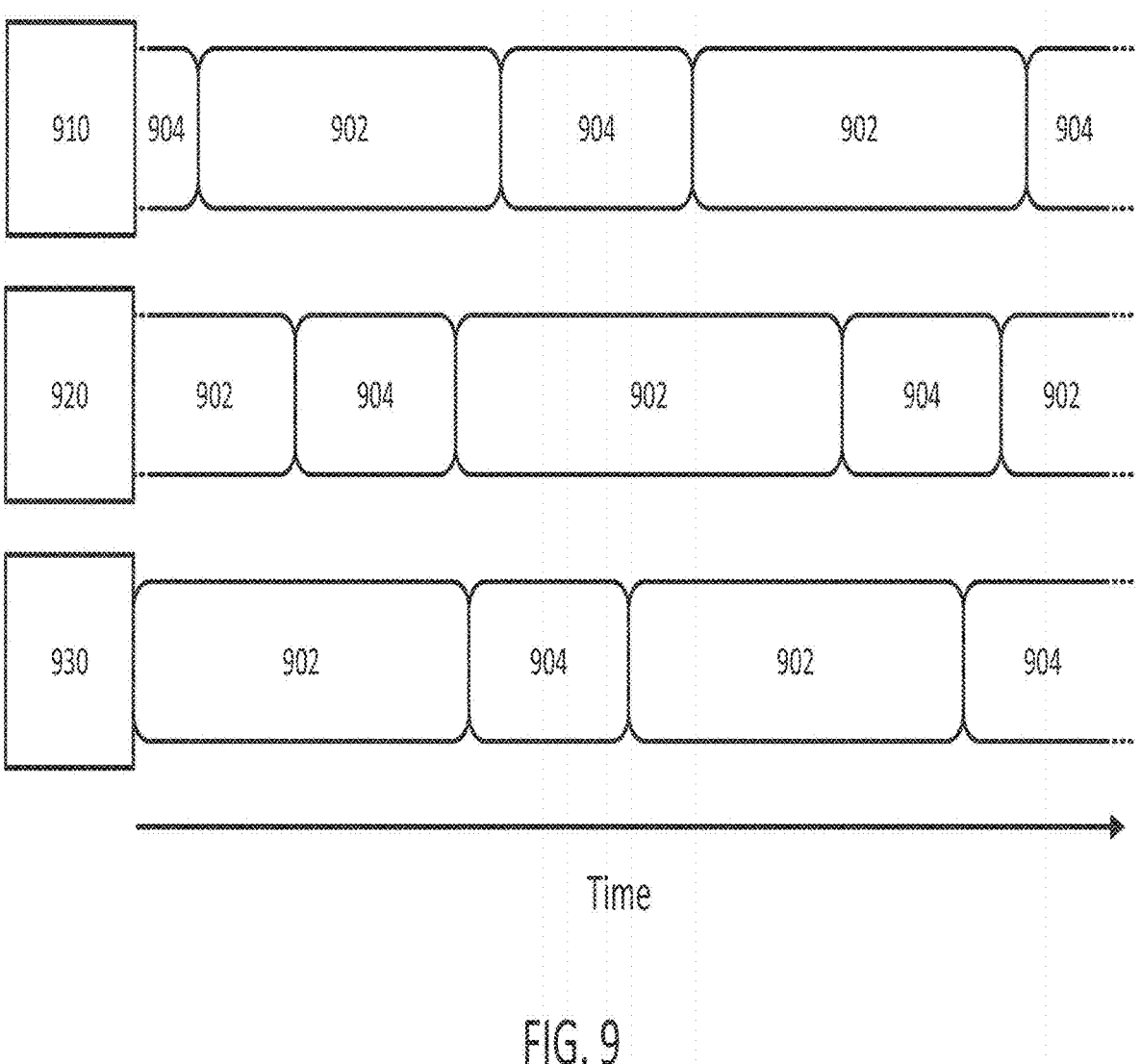
FIG. 9 is a timing diagram of an operation of an array of SSDs each having architectures supporting low latency operation, according to one embodiment of the invention.

FIG. 9 is a timing diagram of an operation of an array of SSDs 910, 920, and 930 each having architectures supporting low latency operation, according to one embodiment of the invention. For simplicity of explanation, the timing diagram of FIG. 9 shows the operation of a single isolation region within each of the SSDs 910, 920, and 930. However, the operation shown and described in connection with the timing diagram of FIG. 9 is not so limited, and is equally applicable to three isolation regions within an SSD or spread across one or more SSDs.

The isolation regions of the SSDs 910, 920, and 930 may be configured in the manner as described above in connection with FIGS. 2a, 2b, 5a-e, with either the physical blocks from each of the non-volatile memory dies of one or more channels, similar to the isolation regions 202-208 as shown in FIG. 2a and isolation region 220 as shown in FIG. 2b, or the physical blocks from non-volatile memory dies across multiple channels, similar to the isolation region 230 as shown in FIG. 2b. Similar to the operation described previously with respect to FIG. 3, each of the isolation regions of the SSDs 910, 920, and 930 alternate between periods of operating in a deterministic mode 902 and a non-deterministic (i.e., maintenance) mode 904. As previously discussed, in the deterministic mode 902 the isolation region performs only read operations, and in the non-deterministic mode 904 the isolation region performs maintenance tasks such as garbage collection and performs write operations that have accumulated for the isolation region while in the deterministic mode 902.

As shown in FIG. 9, at any given point in time at least one of the isolation regions of the SSDs 910, 920, and 930, is in the deterministic mode 902 to provide deterministic read operations. Where each of the isolation regions of the SSDs 910, 920, and 930 have copies of the same data, which typically occurs in data center and storage center environments to ensure sufficient redundancy and back-up of critical data, the operation shown in FIG. 9 of the SSDs 910, 920, and 930 guarantees that at least one copy of the data can be deterministically read at any time. In other embodiments, where, to provide redundancy erasure coding is employed and the data is written in N coded fragments such that any M fragments (where M<N) are required to be able to reconstruct the data, the operation of the SSDs guarantees that M of N SSDs can be read deterministically at any time. In addition, necessary maintenance and writes can be performed for the isolation regions without interfering with deterministic read operations of the data. The operation of the SSDs 910, 920, and 930 is particularly well-suited for large-scale data center or storage center environments where data is constantly being read from and written to the SSDs by multiple devices concurrently.

While three isolation regions/SSDs 910, 920, and 930 are shown in FIG. 9, again the operation shown and described in connection with the timing diagram of FIG. 9 is not so limited and can be implemented in two or more isolation regions in one or more SSDs according to various embodiments of the invention. For example, where two isolation regions within a single SSD are used to store copies of the data then one isolation region should be in the deterministic mode to perform read operations of the data while the other isolation region undergoes maintenance and/or performs write operations in the non-deterministic mode. Similarly, where four isolation regions across two SSDs are used to store copies of the data, for example, up to three of the isolation regions can be in the non-deterministic mode at any point in time, with the remaining one or more isolation regions are in the deterministic mode to provide for read operations. However, it may be preferable to operate the SSDs such that two or more isolation regions are operating in the deterministic mode at all times to provide flexibility for read data error handling as will be described in greater detail below.

Figure 10:
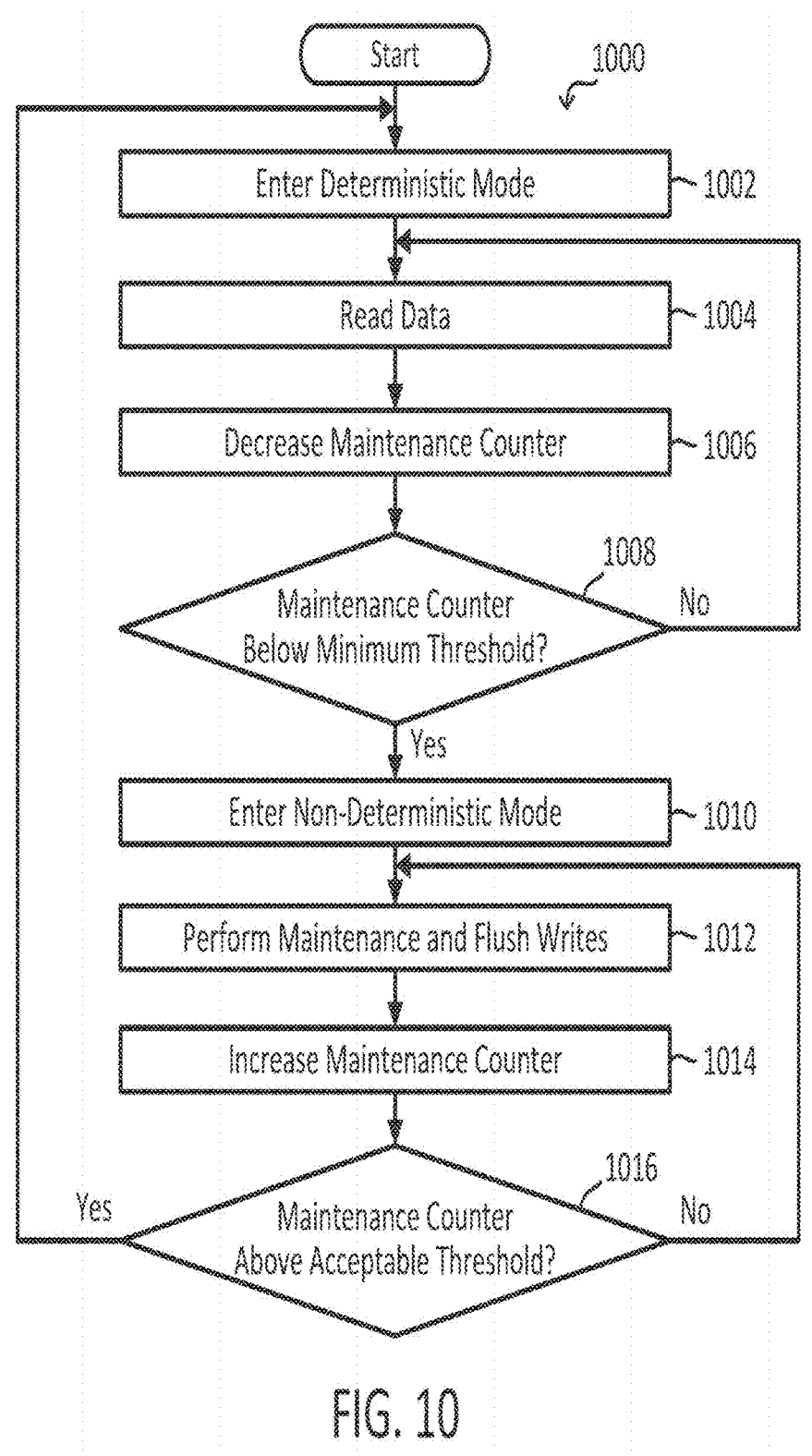
FIG. 10 is a flow chart of method steps for low latency operation of an SSD, according to one embodiment of the invention.

FIG. 10 is a flow chart of method steps 1000 for low latency operation of an SSD, according to one embodiment of the invention. The method steps 1000 are described with respect to a single isolation region within the SSD for simplicity of explanation, and can similarly be applied to other isolation regions of the SSD or an array of SSDs consistent with the various embodiments of the present invention. As shown in FIG. 10, in a step 1002, the isolation region enters the deterministic mode. At step 1004, data is read from the isolation region. In a step 1006, one or more maintenance counters for the isolation region is decreased. In one embodiment, the maintenance counter tracks a number of read operations in the isolation region and the starting value of the maintenance counter is a typical number of read operations that can be performed before maintenance operations are required. In this or other embodiments, the maintenance counter tracks increments of time, a number of write operations queued for the isolation region, or a combination of a number of read operations, a number of write operations, and/or increments of time. In a step 1008, a check of the maintenance counter is made to determine whether the maintenance counter is below a minimum threshold indicating that maintenance needs to be performed on the isolation region. If the maintenance counter is still above the minimum threshold, then maintenance does not yet need to be performed and the isolation region can continue processing read commands and reads data again at step 1004.

However, if the maintenance counter is below the minimum threshold indicating that maintenance needs to be performed on the isolation region, then in a step 1010, the isolation region enters the non-deterministic mode. In a step 1012, the isolation region performs maintenance operations and accumulated write operations. In a step 1014, as maintenance operations are performed the maintenance counter is correspondingly increased. In a step 1016, the maintenance counter is checked to determine whether sufficient maintenance operations have been performed and the isolation region can return to operating in the deterministic mode. If so, then the isolation region re-enters the deterministic mode at step 1002 and the method steps 1000 repeats. If not, then additional maintenance operations and write operations are performed again at step 1012.

The maintenance counter can be implemented in any suitable manner, for example, as a status register in one embodiment. In one embodiment, the status register monotonically decreases as data is read from the isolation region at steps 1004 and 1006, and monotonically increases as maintenance and write operations are performed at steps 1012 and 1014. Additionally, it is not critical that the maintenance counter decreases at step 1006 as read operations are performed at step 1004 and increases at step 1014 as maintenance operations are performed at step 1012. In another embodiment, the maintenance counter increases as read operations are performed at step 1004 and decreases as maintenance operations are performed 1012. In this embodiment, the check at step 1008 will determine whether the maintenance counter is above a maximum threshold indicating that maintenance needs to be performed on the isolation region, and the check at step 1016 will determine whether the maintenance counter is below an acceptable threshold indicating that sufficient maintenance operations have been performed and the isolation region can return to operating in the deterministic mode.

In one embodiment, the isolation region does not automatically transition from the deterministic mode of operation to the non-deterministic mode of operation at step 1010 when the maintenance counter is determined below the minimum threshold at step 1008 and transition from the non-deterministic mode of operation to the deterministic mode of operation at step 1002 when the maintenance counter is determined to be above an acceptable threshold at step 1016. Rather, the host device can be configured to set the operation mode (i.e., deterministic or non-deterministic) of the isolation region. In this embodiment, the SSD provides an estimate to the host device as to when the isolation region will require maintenance.

For example, when the maintenance counter is determined to be below the minimum threshold, the SSD may send a notification to the host device indicating to the host that maintenance will need to be performed on the isolation region within a certain period of time or within a certain number of read operations. The host device can then coordinate the timing of when the isolation region enters the non-deterministic mode to perform maintenance operations with other isolation regions storing copies of the same data to ensure that a copy of the data can be deterministically accessed from another isolation region while maintenance is being performed on the current isolation region in the manner as previously explained in connection with FIG. 9.

Further, once sufficient maintenance and write operations have been performed and the maintenance counter is above an acceptable threshold, the SSD may send another notification to the host device indicating to the host that the isolation region is ready to resume operation in the deterministic mode and the host device can coordinate the timing of when the isolation region or namespace re-enters the deterministic mode from the non-deterministic mode with other isolation regions that have a copy of the same data and that require maintenance. In one embodiment, the host device need not wait for an indication from the SSD to change the mode of operation of the isolation region from the deterministic mode to the non-deterministic mode, or vice-versa, and can do so depending on the maintenance needs of the various isolation regions storing copies of the same data. In one embodiment, rather than the SSD sending indications to the host, the host device periodically checks the maintenance counter of the SSD to determine whether maintenance is needed by the isolation region. In another embodiment, the host enters/leaves deterministic mode according to the workload balance of read and write operations at any given time. For example, deterministic mode may be selected when read operations predominate or non-deterministic mode selected when write operations predominate. In another embodiment, the host estimates durations for the deterministic mode and non-deterministic mode based on the maintenance counter thresholds and schedules switching an isolation region between the modes solely based on time but also uses the current maintenance counter values to create exceptions to this schedule.

Part 4: Read Data Error Handling

In one embodiment, an SSD such as SSD 100 of FIG. 1 is configured to implement multiple levels of error correction to assist in correctly reading data from the non-volatile memory array. The levels of error correction differ in complexity and amount of processing resources required. Controller 120 of SSD 100 is configured to apply error correction to data read from a page of non-volatile memory starting with the lowest level of error correction complexity and if the data is not successfully recovered, to then apply the next higher level of error correction complexity until the data is successfully recovered or the available error correction is exhausted and the data is deemed unrecoverable. In one embodiment, the levels of error correction techniques, in order of increasing complexity, include hard-decision low-density parity check (LDPC), one or more levels of soft-decision LDPC, and quadruple swing-by code (QSBC). Other types of error correction coding such as BCH (Bose-Chaudhuri-Hocquenghem) block codes are within the scope of the invention. Applying multiple levels of error correction improves the SSD's ability to successfully read data but may introduce significant latency.

As described above in conjunction with FIG. 9, datacenters often store multiple copies of data in different isolation regions or namespaces within an SSD and/or in different SSDs in the same or different geographical locations. In such an environment, a host application has the ability to read the data from any of the different locations that are available. If a read command to one SSD, isolation region, or namespace is not successful, that is, the read command returned an error, the host application can attempt to read the same data from another location. For example, if SSD 910 returns an error for a read command, then the data may be read from SSD 920 or SSD 930.

In one embodiment, the firmware of controller 120 is configured to enable a host application to select a maximum read recovery level, corresponding to a level of error correction, with a typical read latency. The host application can select the maximum read recovery level and its related read latency for all read commands to a particular SSD, isolation region, or namespace or make a selection for each read command individually. If a host application selects a maximum read recovery level that is lower than the highest level of error correction that the controller of the SSD is capable of, the SSD will return a read error sooner than if all levels of error correction are applied. The host application can then attempt to read the data from another SSD, isolation region, or namespace. If a host application has not "opted-in" by selecting a maximum read recovery level for a read command, the SSD will apply the error correction techniques in increasing levels of complexity until the data has been read successfully or the error correction techniques are exhausted. One embodiment of a set of read recovery levels and associated read latencies is set forth in Table 1.

TABLE 1

| Read Recovery Level | ECC | Average Time |
|---|---|---|
| "0" | Hard-Decision LDPC | 100 µs |
| "1" | Soft-Decision LDPC | 200 µs |
| "2" | QSBC | 1 ms |

Figure 11:
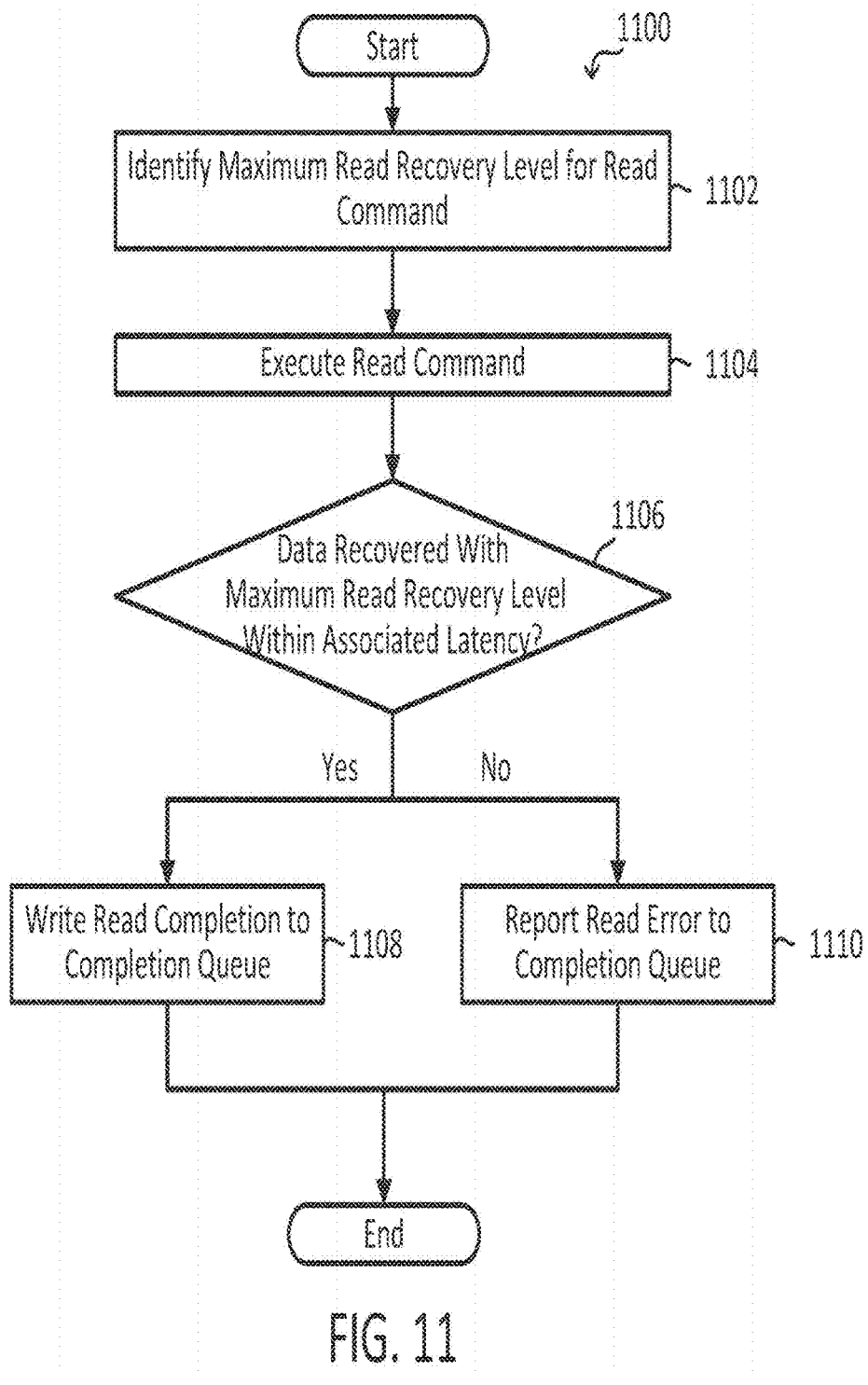
FIG. 11 is a flow chart of method steps for read data error handling by an SSD, according to one embodiment of the invention.

FIG. 11 is a flow chart of method steps 1100 for read data error handling by an SSD, according to one embodiment of the invention. In a step 1102, the firmware of the SSD identifies the maximum read recovery level for a read command received from a host application. In one embodiment, the SSD, isolation region, or namespace has been previously configured to use a maximum read recovery level for all read commands. In another embodiment, the host application makes a selection of a maximum read recovery level for each read command individually. In a step 1104, the SSD executes the read command including the applicable error correction levels. For example, if the host application selected read recovery level "1" in Table 1, the SSD will first apply a hard-decision LDPC technique to the data and if the data not successfully recovered will then apply a soft-decision LDPC technique. In a step 1106, the firmware of the SSD determines whether the data has been successfully read with the maximum read recovery level within its associated read latency. If the data was recovered successfully, then in step 1108 the SSD writes a read completion to the completion queue of the host application. If the data was not recovered successfully, then in a step 1110 the SSD reports a read error to the completion queue of the host application.

Figure 12:
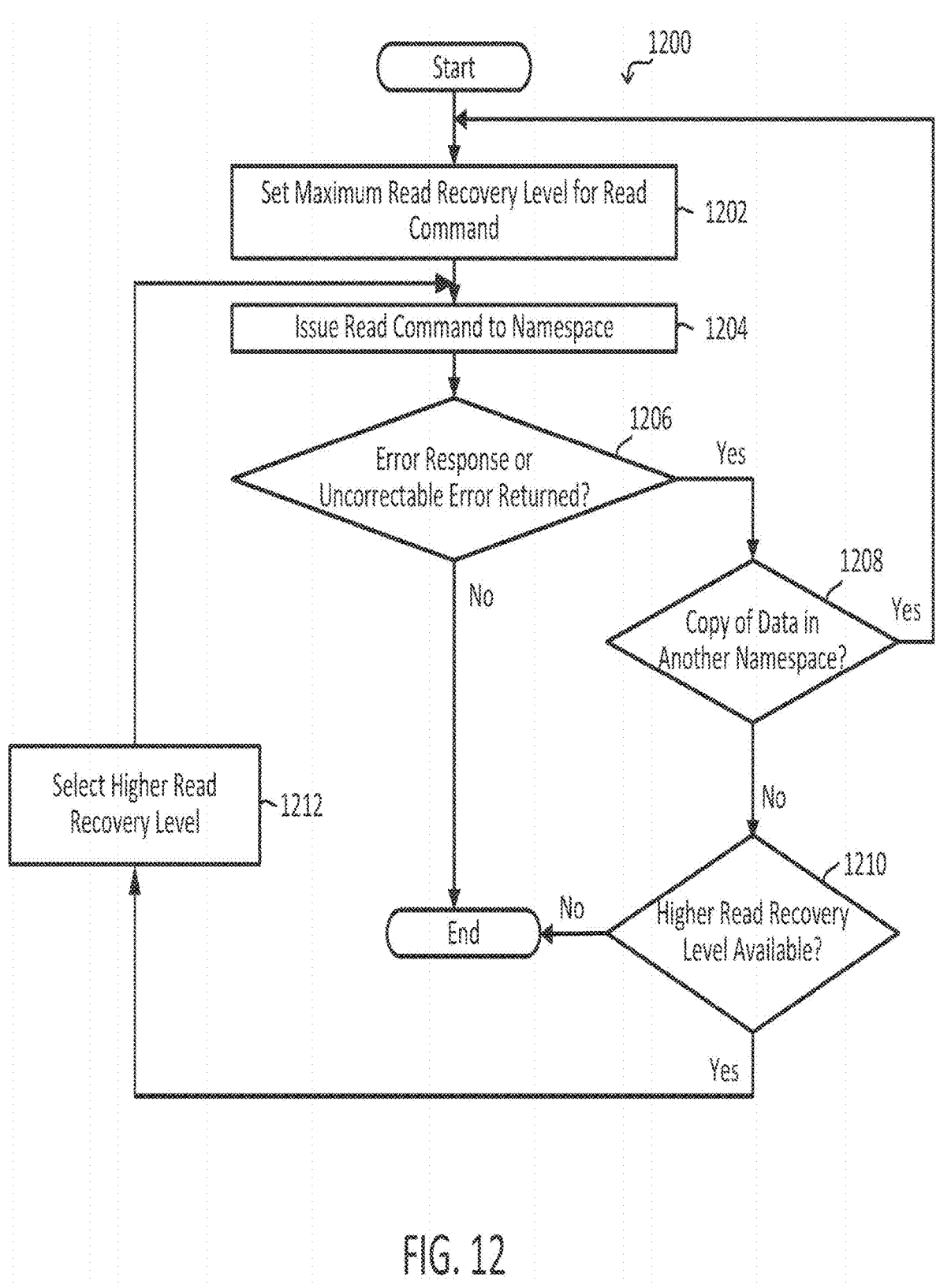
FIG. 12 is a flow chart of method steps for read data error handling by a host device connected to one or more SSDs, according to one embodiment of the invention.

FIG. 12 is a flow chart of method steps 1200 for read data error handling by a host application connected to one or more SSDs, according to one embodiment of the invention. In a step 1202, the host application sets a maximum read recovery level for a read command. In another embodiment, the host application sets a maximum read recovery level globally for all read commands issued to a particular namespace, isolation region, or SSD. In a step 1204, the host application issues the read command to a namespace in an SSD. In a step 1206, the host application checks its completion queue to determine whether the SSD returned an uncorrectable error for the requested data or some other error response. If the SDD returned an error, then in a step 1208 the host application determines whether another copy of the requested data is stored in another namespace, isolation region, or SSD. If so, then the method returns to step 1202 where the host application attempts to read the data from another namespace. If in step 1208 the host application determines that another copy of the data is not available in another namespace, for example if no other copy of the data exists or the other data location is experiencing a power failure, then in a step 1210 the host application determines whether a higher read recovery level is available. If no higher read recovery level is available for that namespace, then the method ends (read command returned as an error). If a higher read recovery level is available, in a step 1212 the host application selects the higher read recovery level, which may be the highest level of error correction available. The method then returns to step 1204.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, principles according to the present invention could be applied to other examples, which, even if not specifically described here in detail, would nevertheless be within the scope of the present invention.

What is claimed is:

1. A method of operating a solid state drive (SSD), the method comprising:
   receiving a read command from a host interface;
   identifying a region of the SSD to which the read command is issued;
   identifying a read recovery level that has been configured by a host to be associated with the region of the SSD; and
   executing the read command and performing error correction on read data associated with the read command based on the identified read recovery level.

2. The method of claim 1, wherein the region is a namespace of the SSD, the method further comprising associating the namespace with the region, and assigning the read recovery level to the region.

3. The method of claim 2, further comprising:
   if executing the read command is not successful, identifying another namespace where a copy of the read data is located.

4. The method of claim 2, further comprising:
   assigning a maximum error correction complexity to all namespaces of the SSD.

5. The method of claim 1, wherein the region is an isolation region comprising a subset of dies of a plurality of dies of the SSD, the method further comprising associating the isolation region with the region, and assigning the read recovery level to the region.

6. The method of claim 5, further comprising:
   if executing the read command is not successful, identifying another isolation region where a copy of the read data is located.

7. The method of claim 5, further comprising:
   assigning a maximum error correction complexity to all isolation regions of the SSD.

8. The method of claim 1, wherein the read recovery level corresponds to a maximum compexity level one of a hard-decision low-density parity check (LDPC), soft-decision LDPC, quadruple swing-by code (QSBC) and Bose-Chaudhuri-Hocquenghem (BCH).

9. The method of claim 8, wherein performing error correction includes first attempting error correction using the maximum complexity level.

10. The method of claim 8, wherein performing error correction includes first attempting error correction using the maximum complexity level, and if first attempting is not successful, second attempting error correction using a higher complexity level error correction of one of the hard-decision low-density parity check (LDPC), soft-decision LDPC, quadruple swing-by code (QSBC) and Bose-Chaudhuri-Hocquenghem (BCH).

11. A solid state drive (SSD) comprising:
a plurality of dies; and
a controller configured to:
  receive a read command from a host interface;
  identify a region of the SSD to which the read command is issued;
  identify a read recovery level that has been configured by a host to be associated with the region of the SSD; and
  execute the read command and performing error correction on read data associated with the read command based on the identified read recovery level.

12. The SSD of claim 11, wherein the region is a namespace of the SSD, the controller further configured to associate the namespace with the region, and assigning the read recovery level to the region.

13. The SSD of claim 12, wherein the controller is further configured to:
  if executing the read command is not successful, identify another namespace where a copy of the read data is located.

14. The SSD of claim 12, wherein the controller is further configured to:
  assign a maximum error correction complexity to all namespaces of the SSD.

15. The SSD of claim 11, wherein the region is an isolation region comprising a subset of dies of a plurality of dies of the SSD, the controller further configured to associate the isolation region with the region, and assigning the read recovery level to the region.

16. The SSD of claim 15, wherein the controller is further configured to:
  if executing the read command is not successful, identify another isolation region where a copy of the read data is located.

17. The SSD of claim 15, wherein the controller is further configured to:
  assign a maximum error correction complexity to all isolation regions of the SSD.

18. The SSD of claim 11, wherein the read recovery level corresponds to a maximum compexity level one of a hard-decision low-density parity check (LDPC), soft-decision LDPC, quadruple swing-by code (QSBC) and Bose-Chaudhuri-Hocquenghem (BCH).

19. The SSD of claim 18, wherein performing error correction includes first attempting error correction using the maximum complexity level.

20. The SSD of claim 18, wherein performing error correction includes first attempting error correction using the maximum complexity level, and if first attempting is not successful, second attempting error correction using a higher complexity level error correction of one of the hard-decision low-density parity check (LDPC), soft-decision LDPC, quadruple swing-by code (QSBC) and Bose-Chaudhuri-Hocquenghem (BCH).

* * * * *